US010430896B2

(12) United States Patent
Horie

(10) Patent No.: US 10,430,896 B2
(45) Date of Patent: Oct. 1, 2019

(54) INFORMATION PROCESSING APPARATUS AND METHOD THAT RECEIVES IDENTIFICATION AND INTERACTION INFORMATION VIA NEAR-FIELD COMMUNICATION LINK

(71) Applicant: SONY MOBILE COMMUNICATIONS INC., Tokyo (JP)

(72) Inventor: Kazuyoshi Horie, Tokyo (JP)

(73) Assignee: SONY CORPORATION, Tokyo (JP)

(*) Notice: Subject to any disclaimer, the term of this patent is extended or adjusted under 35 U.S.C. 154(b) by 168 days.

(21) Appl. No.: 15/662,520

(22) Filed: Jul. 28, 2017

(65) Prior Publication Data
US 2018/0040076 A1 Feb. 8, 2018

(30) Foreign Application Priority Data

Aug. 8, 2016 (JP) ................................. 2016-155518

(51) Int. Cl.
| | |
|---|---|
| *G06Q 50/00* | (2012.01) |
| *G06F 16/29* | (2019.01) |
| *G06F 16/583* | (2019.01) |
| *G06F 3/0481* | (2013.01) |
| *G06F 21/62* | (2013.01) |
| *G06K 9/00* | (2006.01) |
| *G06F 21/32* | (2013.01) |
| *G06F 21/35* | (2013.01) |
| *H04W 4/02* | (2018.01) |
| *G06F 16/951* | (2019.01) |
| *H04L 29/08* | (2006.01) |

(52) U.S. Cl.
CPC .......... *G06Q 50/01* (2013.01); *G06F 3/0481* (2013.01); *G06F 16/29* (2019.01); *G06F 16/583* (2019.01); *G06F 21/32* (2013.01); *G06F 21/35* (2013.01); *G06F 21/6245* (2013.01); *G06K 9/00* (2013.01); *G06K 9/00288* (2013.01); *H04W 4/02* (2013.01); *G06F 16/951* (2019.01); *H04L 67/02* (2013.01); *H04L 67/18* (2013.01); *H04L 67/306* (2013.01)

(58) Field of Classification Search
CPC ....................................................... G10L 17/00
USPC ........................................................ 704/246
See application file for complete search history.

(56) References Cited

U.S. PATENT DOCUMENTS

| | | | |
|---|---|---|---|
| 6,682,351 B1* | 1/2004 | Abraham-Fuchs | ...................... A63B 23/0244 434/247 |
| 9,406,211 B2* | 8/2016 | Sahiholnasab | ......... A61B 5/103 |
| 2005/0086056 A1* | 4/2005 | Yoda | ...................... G10L 15/24 704/246 |
| 2006/0286969 A1* | 12/2006 | Talmor | ...................... G06F 21/32 455/415 |
| 2007/0239457 A1* | 10/2007 | Sorvari | ................... G10L 17/00 704/270 |
| 2007/0273583 A1* | 11/2007 | Rosenberg | ............ H04W 8/005 342/367 |

(Continued)

FOREIGN PATENT DOCUMENTS

JP 2016-506549 3/2016

*Primary Examiner* — Shaun Roberts
(74) *Attorney, Agent, or Firm* — Xsensus LLP

(57) ABSTRACT

There is provided an information processing server including a specification unit configured to specify an individual registered in a predetermined database on the basis of identification information sent from a near-field communication device and collected voice information.

19 Claims, 18 Drawing Sheets

(56) References Cited

U.S. PATENT DOCUMENTS

| | | | |
|---|---|---|---|
| 2011/0219018 A1* | 9/2011 | Bailey | G10L 15/10 707/769 |
| 2012/0150960 A1* | 6/2012 | Nalawade | G06Q 30/02 709/204 |
| 2013/0110565 A1* | 5/2013 | Means, Jr. | G06Q 10/06 705/7.11 |
| 2013/0156274 A1* | 6/2013 | Buchmueller | G06Q 10/101 382/118 |
| 2013/0158859 A1* | 6/2013 | Sathish | G06T 11/20 701/409 |
| 2014/0108501 A1 | 4/2014 | Papakipos et al. | |
| 2014/0121540 A1* | 5/2014 | Raskin | A61B 5/6898 600/479 |
| 2014/0295764 A1* | 10/2014 | Jain | H04W 4/80 455/41.2 |
| 2015/0003599 A1* | 1/2015 | Brunn | H04L 65/1069 379/142.04 |
| 2015/0058016 A1* | 2/2015 | Goldstein | G06F 16/636 704/246 |
| 2016/0005050 A1* | 1/2016 | Teman | G06F 16/583 705/317 |
| 2017/0026470 A1* | 1/2017 | Bhargava | H04L 67/1097 |
| 2017/0308909 A1* | 10/2017 | Faith | G06Q 30/0201 |

* cited by examiner

FIG.11

| USER NAME | INTERACTION HISTORY | VOICE DIRECTION | POSTURE | PLAY BUTTON | EVALUATION BUTTON | DELETE BUTTON |
|---|---|---|---|---|---|---|
| USER B | MONTH: A, DAY: B, HH:MM | FRONT | STANDING | PLAY | EVALUATE | DELETE |
| USER C | MONTH: X, DAY: Y, hh:mm | — | STANDING | — | — | DELETE |

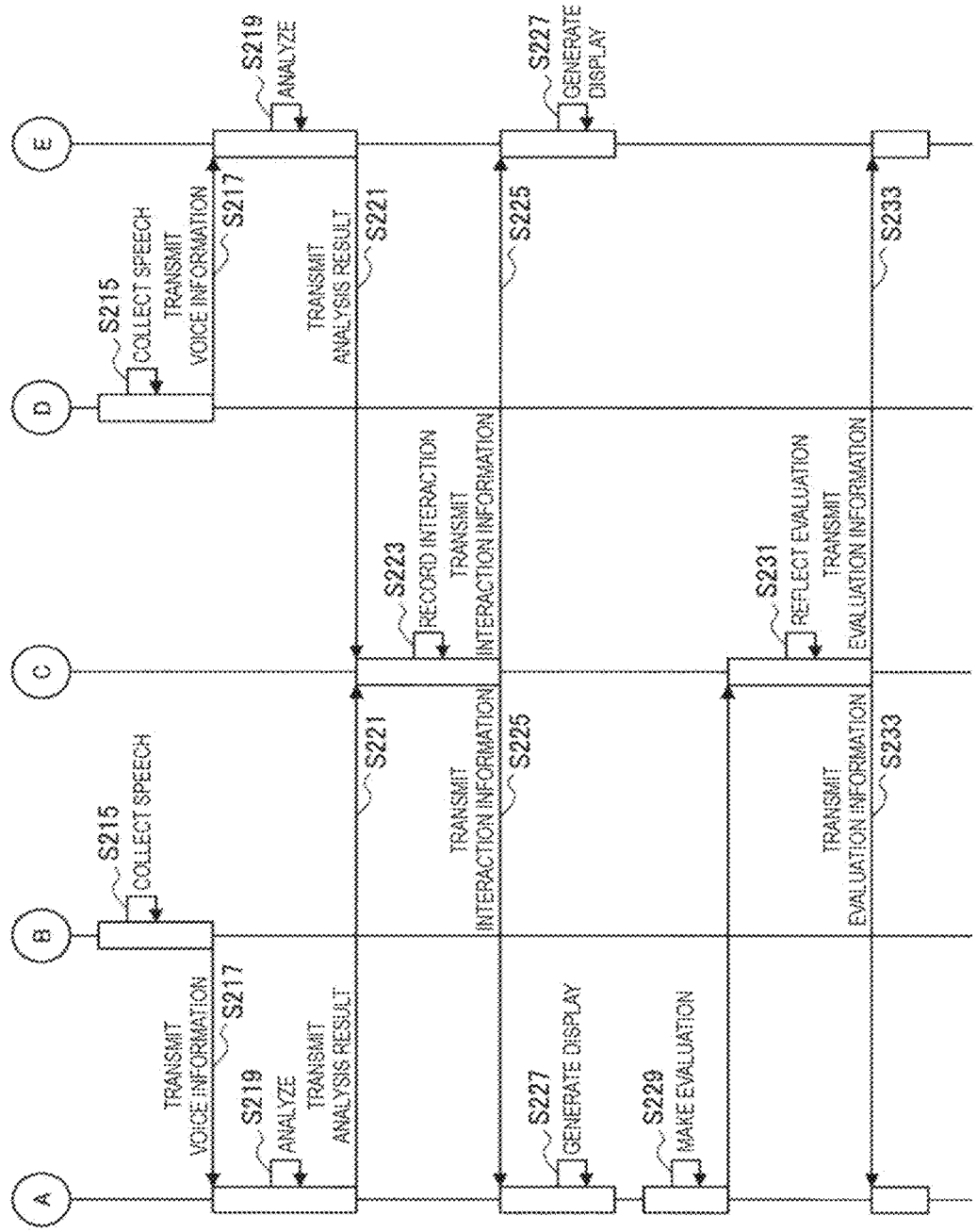

INFORMATION PROCESSING APPARATUS AND METHOD THAT RECEIVES IDENTIFICATION AND INTERACTION INFORMATION VIA NEAR-FIELD COMMUNICATION LINK

CROSS REFERENCE TO RELATED APPLICATIONS

This application claims the benefit of Japanese Priority Patent Application JP 2016-155518 filed Aug. 8, 2016, the entire contents of which are incorporated herein by reference.

BACKGROUND

The present disclosure relates to information processing servers, information processing devices, information processing systems, information processing methods, and programs.

In recent years, interaction among users using a social networking service or the like on a network has become popular. In many cases, the interaction in the network such as a social networking service is triggered by interaction in an actual real world.

To link an individual met in the real world with individual information in the network such as a social networking service, it is necessary to obtain information for specifying the individual such as a name. However, it may be difficult to get the name or the like of the individual within short interaction time in the real world.

For example, JP 2016-506549T listed below discloses that individuals around a user are identified by using facial recognition or the like and information about the identified individuals is provided to the user.

SUMMARY

However, from the viewpoint of privacy protection, it is desirable to avoid using images including faces of individuals to identify an individual.

Therefore, according to embodiments of the present disclosure, there is provided a novel and improved information processing server, information processing device, information processing system, information processing method, and program that are capable of specifying individuals met in the real world and providing opportunity for interaction in a network.

According to an embodiment of the present disclosure, there is provided an information processing server including a specification unit configured to specify an individual registered in a predetermined database on the basis of identification information sent from a near-field communication device and collected voice information.

In addition, according to an embodiment of the present disclosure, there is provided an information processing device including a notification generation unit configured to generate interaction notification that presents a user with interaction information indicating interaction with an individual who is specified on the basis of identification information sent from a near-field communication device and collected voice information.

In addition, according to an embodiment of the present disclosure, there is provided an information processing system including: a specification unit configured to specify an individual registered in a predetermined database on the basis of identification information sent from a near-field communication device and collected voice information; and a notification generation unit configured to generate interaction notification that presents a user with interaction information indicating interaction with the individual specified by the specification unit.

In addition, according to an embodiment of the present disclosure, there is provided an information processing method including specifying an individual registered in a predetermined database on the basis of identification information sent from a near-field communication device and collected voice information by using an arithmetic processing unit.

In addition, according to an embodiment of the present disclosure, there is provided a program causing a computer to function as a specification unit configured to specify an individual registered in a predetermined database on the basis of identification information sent from a near-field communication device and collected voice information.

According to the embodiments of the present disclosure, it is possible to specify individuals registered in a predetermined database on the basis of identification information received from other wearable terminals and voice information spoken by other users.

As described above, according to the embodiments of the present disclosure, it is possible to specify individuals met in the real world and provide opportunity for interaction in a network while paying attention to privacy protection.

Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 11 is an explanatory diagram illustrating a first display example displayed on a notification unit serving as a display device;

FIG. 15B is a sequence diagram illustrating a case where an information processing server analyzes a voiceprint in voice information;

DETAILED DESCRIPTION OF THE EMBODIMENT(S)

Figure 1:
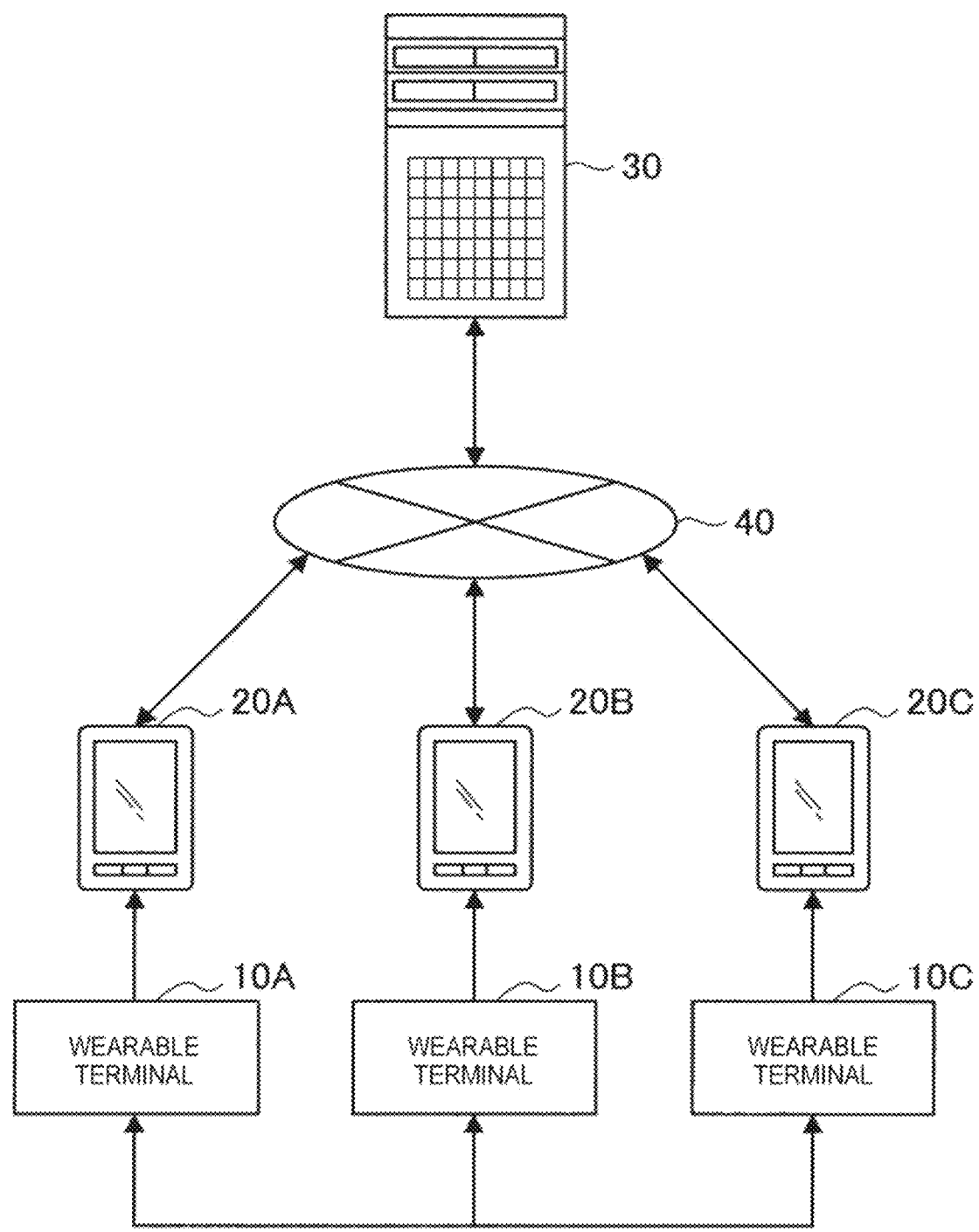
FIG. 1 is an explanatory diagram illustrating a schematic configuration of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is given in the following order.
1. Overview of information processing system
2. Configuration example of information processing system
3. Example of display for user
3.1. First display example
3.2. Second display example
3.3. Third display example
4. Operation example of information processing system
5. Modification
6. Conclusion

1. OVERVIEW OF INFORMATION PROCESSING SYSTEM

First, with reference to FIG. 1, an overview of an information processing system according to an embodiment of the present disclosure will be described. FIG. 1 is an explanatory diagram illustrating a schematic configuration of the information processing system according to the embodiment.

As illustrated in FIG. 1, the information processing system according to the embodiment includes wearable terminals 10A, 10B, and 10C held by respective users, information processing devices 20A, 20B, and 20C held by the respective users, and an information processing server 30 connecting with the information processing devices 20A, 20B, and 20C via a network 40.

Note that, the wearable terminal 10A is held by a user (for example, user A) who has the information processing device 20A, the wearable terminal 10B is held by a user (for example, user B) who has the information processing device 20B, and the wearable terminal 10C is held by a user (for example, user C) who has the information processing device 20C. Also, hereinafter, a set of the wearable terminals 10A, 10B, and 10C is also referred to as wearable terminals 10, and a set of the information processing devices 20A, 20B, and 20C is also referred to as information processing devices 20.

The wearable terminal 10 is an information processing device worn on any part of a body of the user, and the wearable terminal 10 has a near-field communication function and a sound collection function. The form of the wearable terminal 10 may be any form. For example, the wearable terminal 10 may be a glasses-type terminal worn on the face of the user, a badge-type terminal worn on the chest or the like of the user, or a watch-type terminal worn on a wrist or the like of the user.

Specifically, the wearable terminals 10 transmit/receive identification information of themselves between each other by using the near-field communication function. For example, the near-field communication function may be constituted by an antenna and a communication circuit that support Bluetooth (registered trademark) for wireless communication of information at a distance of about several meters to 100 meters. The communication range of the near-field communication such as Bluetooth is limited to about several meters to 100 meters. Therefore, for example, in the case where the wearable terminal 10A receives the identification information of the wearable terminal 10B, it is possible for the information processing system to determine that the wearable terminal 10B is near the wearable terminal 10A.

In addition, the wearable terminal 10 acquires sound around the wearable terminal 10 by using the sound collection function. For example, the sound collection function may be constituted by a signal processing circuit and a microphone configured to collect ambient sound. Thereby, it is possible for the information processing system to collect voice of another user with whom a user has interacted in the real world by using the wearable terminal 10, and recognize that the user has interacted with the another user such as chatting.

Such identification information and voice information acquired by the wearable terminal 10 are transmitted to the information processing device 20 through the near-field communication, and transmitted to the information processing server 30 via the information processing device 20.

The information processing device 20 is a mobile communication device carried by a user, and the information processing device 20 has the near-field communication function and a function of connecting with the network 40. For example, the information processing device 20 may be a smartphone, a mobile phone, a tablet terminal, a personal digital assistant (PDA), or the like.

Specifically, by using the near-field communication function, the information processing device 20 receives the identification information and the voice information acquired by the wearable terminal 10. For example, the near-field communication function may be constituted by a communication circuit and an antenna for wireless communication of information at a distance of about several meters to 100 meters.

In addition, by using the function of connecting with the network 40, the information processing device 20 transmits the identification information and the voice information received from the wearable terminal 10 to the information processing server 30. For example, the function of connecting with the network 40 may be constituted by an antenna and a communication circuit that support connection with wireless LANs, public networks, mobile communication networks, or the Internet.

The information processing server 30 stores a predetermined database in which personal information and the like of respective users is registered, and specifies another user who a user has met by using the predetermined database on the basis of the voice information and the identification information of the wearable terminal 10 that have been received through the network 40. For example, the predetermined database may be a database of a social networking service or the like in which profile information of the users, information on a history of interaction between the user and the other users, and the like are registered.

Specifically, the information processing server 30 specifies which of users registered in a predetermined database the user B is, on the basis of identification information of the wearable terminal 10B held by the user B who the user A has met in the real world, and voice information including voice of the user B. Note that, the identification information of the wearable terminal 10B and the sound information including the voice of the user B that have been used for specifying the user B are information received by a wearable terminal 10 from another wearable terminal 10 through the near-field communication. Such information is transmitted from the wearable terminal 10 to the information processing server 30 via the information processing device 20 and the network 40.

Since the identification information of each wearable terminal 10 is associated with each user registered in the predetermined database, it is possible for the information processing server 30 to specify each user registered in the predetermined database by using the identification information of each wearable terminal 10.

However, the wearable terminal 10A receives identification information of the plurality of wearable terminals 10B and 10C at the same time in the case where the plurality of users B and C are around the user A. In such a case, it is difficult for the information processing system to determine which of the users around the user A the user B or user C is when using only the identification information of the wearable terminals 10B and 10C.

Therefore, the information processing server 30 according to the embodiment further stores information for identifying voice of each user. Thereby, it is possible for the information processing system to identify other users by analyzing sound information including voice of the other users that has been collected by the wearable terminals 10. This enables the information processing system to determine which of the plurality of users around the user A the user B or user C is, on the basis of timings of speeches included in the sound information, information on directions in which voice has been collected, or the like. Note that, the information for specifying voice of users may be voiceprint information or the like of the users.

The network 40 is a communication network in which information is transmitted/received. For example, the network 40 may be a local area network (LAN), a wide area network (WAN), the Internet, a satellite communication network, a telephone network, a mobile communication network (for example, 3G network), an Internet Protocol Virtual Private Network (IP-VPN), or the like.

As described above, it is possible for the information processing system according to the embodiment to specify another user who a user has interacted with in the real world as an individual registered in a predetermined network by using sound information and identification information of a wearable terminal 10.

Here, for example, when the information processing system receives identification information from a plurality of wearable terminals 10 at the same time, it is difficult for the information processing system to determine each user by using only the identification information of the wearable terminals 10 to identify the individuals. Alternatively, in the case of using only the sound information to identify the individuals, the information processing system may also determine that a user has interacted with another user even when the user has not interacted with the another user in the real world but voice of the another user has collected through broadcasting or communication.

However, in the case of using the information processing system according to the embodiment, it is possible to determine another user without using a facial image or the like of the another user but by using both the identification information of the wearable terminals 10 and the sound information of other users who the user has interacted with in the real world.

Also, information of the another user who has been specified may be presented to the user in the form of an image or voice through the wearable terminal 10 or the information processing device 20. This enables the user to immediately check information on the another users who the user has interacted with in the real world.

Although FIG. 1 illustrates the example in which the wearable terminals 10 are devices different from the information processing devices 20, the information processing systems according to the present embodiment is not limited thereto. For example, the wearable terminal 10 and the information processing device 20 may be integrated into one communication device. In such a case, the communication device that functions as the wearable terminal 10 and the information processing device 20 has the near-field communication function, the sound collection function, and the function of connecting with the network 40, and the communication device can be worn on the body of a user.

2. CONFIGURATION EXAMPLE OF INFORMATION PROCESSING SYSTEM

Figure 2:
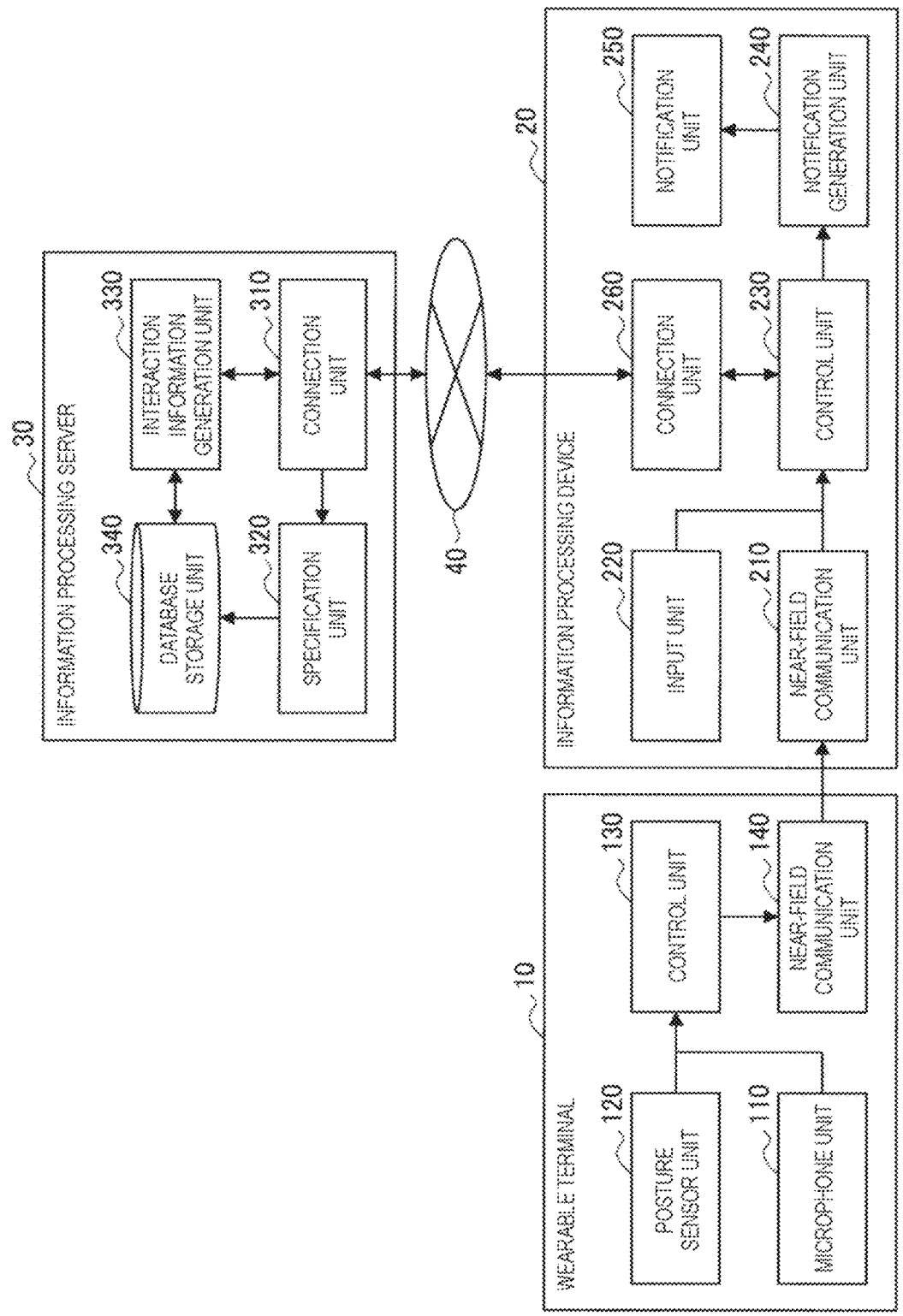
FIG. 2 is a block diagram illustrating an internal configuration of the information processing system according to the embodiment.

Next, with reference to FIG. 2, a specific configuration of the information processing system according to the embodiment will be described. FIG. 2 is a block diagram illustrating an internal configuration of the information processing system according to the embodiment.

As illustrated in FIG. 2, the wearable terminal 10 includes a microphone unit 110, a posture sensor unit 120, a control unit 130, and a near-field communication unit 140. In addition, the information processing device 20 includes an input unit 220, a near-field communication unit 210, a control unit 230, a notification generation unit 240, a notification unit 250, and a connection unit 260. In addition, the information processing server 30 includes a connection unit 310, a specification unit 320, an interaction information generation unit 330, and a database storage unit 340.

(Wearable Terminal 10)

For example, the microphone unit 110 is constituted by a sound collection device such as a microphone, and a signal processing circuit such as a digital signal processor (DSP). The microphone unit 110 collects sound around the wearable terminal 10.

The microphone unit 110 may always collect sound around the wearable terminal 10 or may collect sound around the wearable terminal 10 only in the case where it is determined that a user is interacting with another user.

Specifically, the microphone unit 110 may collect ambient sound during a predetermined period of time from when the near-field communication unit 140 receives identification information of another wearable terminal 10. At this time, it is also possible for the microphone unit 110 to repeat sound collection of a predetermined period of time at a predetermined interval after the near-field communication unit 140 receives the identification information of the another wearable terminal 10. Alternatively, the microphone unit 110 may determines that sound with a volume more than a threshold is voice of a conversation between the user and the another user in the case where the microphone unit 10 detects the sound with the volume more than the threshold, and the microphone 110 may collect the detected sound. Note that, the microphone unit 110 does not have to collect sound for a long time. The microphone unit 110 may stop collecting sound in about three seconds as long as voice of the another user who is chatting with the user is collected.

It is also possible for the microphone unit 110 to collect ambient sound not to include voice of the user himself/herself wearing the wearable terminal 10. It is possible for the microphone unit 110 to identify the voice of the user himself/herself wearing the wearable terminal 10 since an output source of the voice is very close to the wearable terminal 10. Therefore, the microphone unit 110 selectively collects voice of the another user who the user wearing the wearable terminal 10 is interacting with, and does not have to collect voice of the user himself/herself wearing the wearable terminal 10.

The sound collection device included in the microphone unit 110 may be a microphone array device in which a plurality of microphones are arranged. In such a case, it is possible for the microphone unit 110 to estimate a cardinal direction from which collected sound has come. By estimating the cardinal direction from which the sound has come, it is possible for the information processing system to specifically recognize a position of a specified individual.

Figure 3:
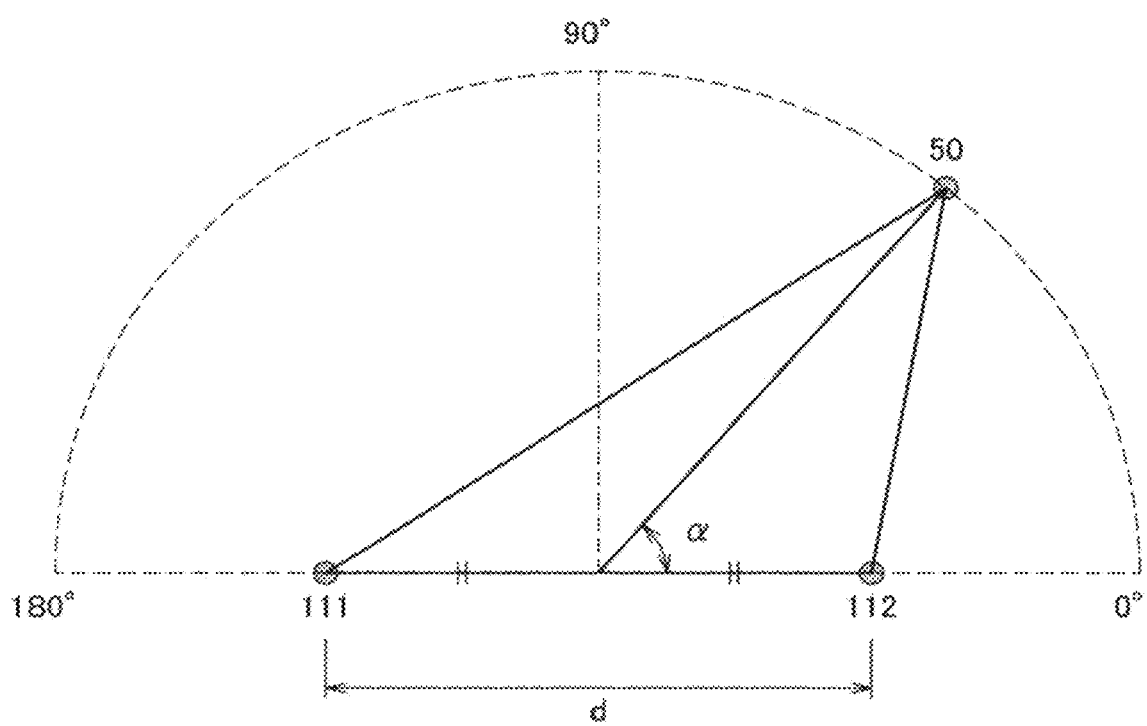
FIG. 3 is an explanatory diagram illustrating positional relation between a sound source and a plurality of microphones of a microphone array device.

Next, with reference to FIG. 3 to FIG. 5, a method for estimating a cardinal direction from which sound has come used by the microphone array device will be described. FIG. 3 is an explanatory diagram illustrating positional relation between a sound source (that is, speaker) and a plurality of microphones in the microphone array device.

As illustrated in FIG. 3, it is assumed that there is a sound source 50 (that is, speaker), and the microphone array device includes a plurality of microphones 111 and 112. In addition, the plurality of microphones 111 and 112 are arranged at a distance d.

Although FIG. 3 illustrates the case where the microphone array device includes the two microphones 111 and 112, the number of microphones is not limited to two. The number of microphones is not limited as long as the number of microphones is plural. Estimation quality of the cardinal direction of the sound source becomes higher as the number of microphones included in the microphone array device increases. In addition, the estimation quality of the cardinal direction of the sound source becomes higher as the distance d between the microphones increases.

In addition, to specifically estimate a cardinal direction of a sound source by using the microphone array device, it is desirable that the plurality of microphones included in the microphone array device be horizontally arranged. Therefore, in the case where the microphone unit 110 includes the microphone array device, it is desirable that the wearable terminal 10 be a glasses-type wearable terminal or a badge-type wearable terminal whose direction and position are less likely to be changed.

Here, a sound wave incident angle α between a line segment connecting the plurality of microphones 111 and 112, and a position of the sound source 50 (in other words, cardinal direction of sound source) is obtained from the following equation 1, where c represents sonic speed, τ represents difference in sound wave arrival time that has been detected by the plurality of microphones 111 and 112.

$$\alpha = \cos^{-1}\left(\frac{c\tau}{d}\right) \quad \text{Equation 1}$$

Next, with reference to FIG. 4 and FIG. 5, a method for detecting the difference in sound wave arrival time between the plurality of microphones 111 and 112 will be described. FIG. 4 is an explanatory diagram illustrating difference in sound wave arrival time between a plurality of microphones. FIG. 5 is a block diagram illustrating a configuration of a circuit configured to detect difference in sound wave arrival time between a plurality of microphones.

Figure 4:
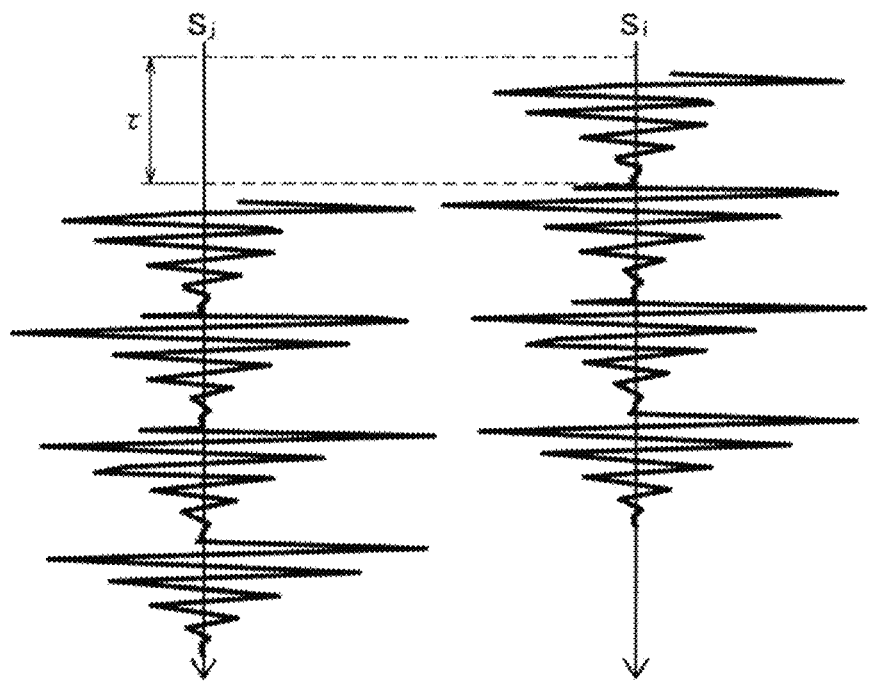
FIG. 4 is an explanatory diagram illustrating difference in sound wave arrival time between a plurality of microphones.

As illustrated in FIG. 4, sound emitted from the sound source 50 arrives at the microphones 111 and 112 with the time difference τ since distances from the sound source 50 to the plurality of microphones 111 and 112 included in the microphone array device are different from each other.

Figure 5:
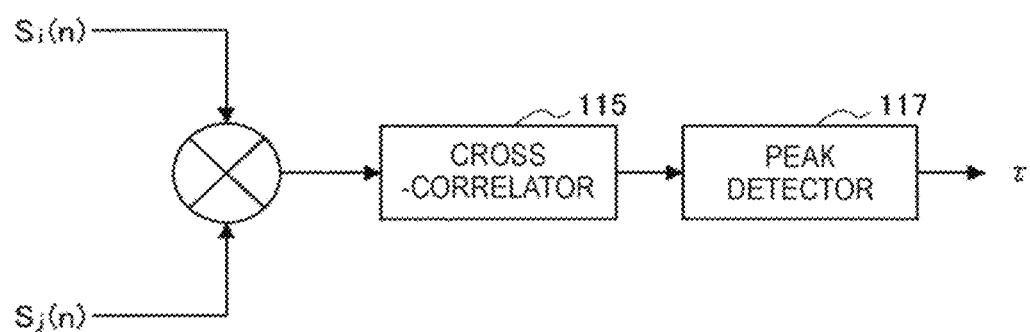
FIG. 5 is a block diagram illustrating a configuration of a circuit configured to detect difference in sound wave arrival time between a plurality of microphones.

The arrival time difference τ can be calculated by an arrival time difference detector illustrated in FIG. 5 that performs an analysis process on the sound signals $S_i$ and $S_j$ where $S_j$ represents a sound signal acquired by the microphone 111 and $S_i$ represents a sound signal acquired by the microphone 112.

Specifically, the arrival time difference detector is constituted by a cross-correlator 115 and a peak detector 117. The cross-correlator 115 detects cross-correlation between the sound signal $S_i$ acquired by the microphone 111 and the sound signal $S_j$ acquired by the microphone 112. The peak detector 117 detects a peak at which the cross-correlation between the sound signals $S_i$ and $S_j$ becomes maximum. For example, the cross-correlator 115 calculates a cross-correlation coefficient from the sound signals $S_i$ and $S_j$. The cross-correlation coefficient is represented by the following equation 2, where n corresponds to a sound sample of a digital signal obtained by performing analog-digital conversion on an analog sound signal, and t corresponds to a time axis of the cross-correlation. In addition, it is possible to appropriately select sampling frequency of the analog-digital conversion in consideration of balance between resolution of the estimated cardinal direction of the sound source 50 and data capacity or processing load.

$$XCORR[t] = E_n(S_i[n]S_j[n-t]) \quad \text{Equation 2}$$

In addition, as illustrated in the following equation 3, the peak detector 117 detects a value of a variable t when a value of a cross-correlation coefficient XCORR becomes maximum. In this case, the variable t is the arrival time difference t to be obtained. Accordingly, it is possible to calculate an angle between the sound source 50 and the microphone array device including the plurality of microphone 111 and 112 (in other words, cardinal direction of sound source) by substituting τ calculated by the arrival time difference detector into the equation 1.

$$\tau = \arg\max ZCORR[t] \quad \text{Equation 3}$$

For example, the posture sensor unit 120 is constituted by an acceleration sensor and a signal processing circuit. The posture sensor unit 120 estimates a posture of a user wearing the wearable terminal 10 by detecting acceleration of the wearable terminal 10. For example, the acceleration sensor may be a various type of acceleration sensor such as a mechanical displacement measurement type sensor, an optical type sensor, a capacitance type sensor, or a piezo resistance type sensor.

This enables the information processing system to transmit/receive information on postures of users wearing the wearable terminals 10 through the near-field communication between the wearable terminals 10 in addition to the identification information. Therefore, it is possible for the information processing system to notify a user of information of a posture of another user who the user is interacting with in the real world. Thereby, the user can recognize more accurately which of the individuals registered in the predetermined database corresponds to which of the other users around himself/herself.

Note that, the sensor included in the posture sensor unit 120 does not have to be the acceleration sensor as long as it can acquire information on the posture of the user wearing the wearable terminal 10. For example, the sensor included in the posture sensor 120 may be a gyro sensor or a vibration sensor. Even in such a case, it is possible for the posture sensor unit 120 to acquire information on the posture of the user wearing the wearable terminal 10.

For example, the control unit 130 is constituted by a micro processing unit (MPU) serving as an arithmetic processing unit, and a memory in which a control program, a control parameter, and the like are stored. The control unit 130 controls the respective structural elements of the wearable terminal 10. Specifically, the control unit 130 controls the respective structural elements such that identification information of itself and information on a posture of a user estimated by the posture sensor unit 120 are transmitted/received to/from another wearable terminal 10. In addition, the control unit 130 controls the respective structural elements such that sound information collected by the microphone unit 110, information on a posture of a user and identification information that have been received from another wearable terminal 10 are transmitted to the information processing device 20.

For example, the near-field communication unit 140 is constituted by an antenna and a communication circuit. The near-field communication unit 140 establishes near-field communication with the other wearable terminals 10 and the information processing device 20. Specifically, the near-field communication unit 140 transmits/receives identification information of itself and information on a posture of a user estimated by the posture sensor unit 120 to/from another wearable terminal 10. For example, the identification information transmitted from the near-field communication unit 140 to the another wearable terminal 10 may be identification information for pairing in the near-field communication. In addition, the near-field communication unit 140 transmits sound information collected by the microphone unit 110, information on a posture of a user and identification information that have been received from another wearable terminal 10 to the information processing device 20.

It is only necessary for a communication method used by the near-field communication unit 140 to have a communication range with a radius of about several meters to 100 meters. For example, the communication method may be Wi-Fi (registered trademark), ZigBee (registered trademark), Bluetooth (registered trademark), Bluetooth low energy (registered trademark), ANT (registered trademark), or ANT+ (registered trademark). Specifically, the near-field communication unit 140 may establish near-field communication by using Bluetooth or Bluetooth low energy. In this case, identification information to be transmitted from the near-field communication unit 140 to another wearable terminal 10 may be a Bluetooth ID.

Figure 6:
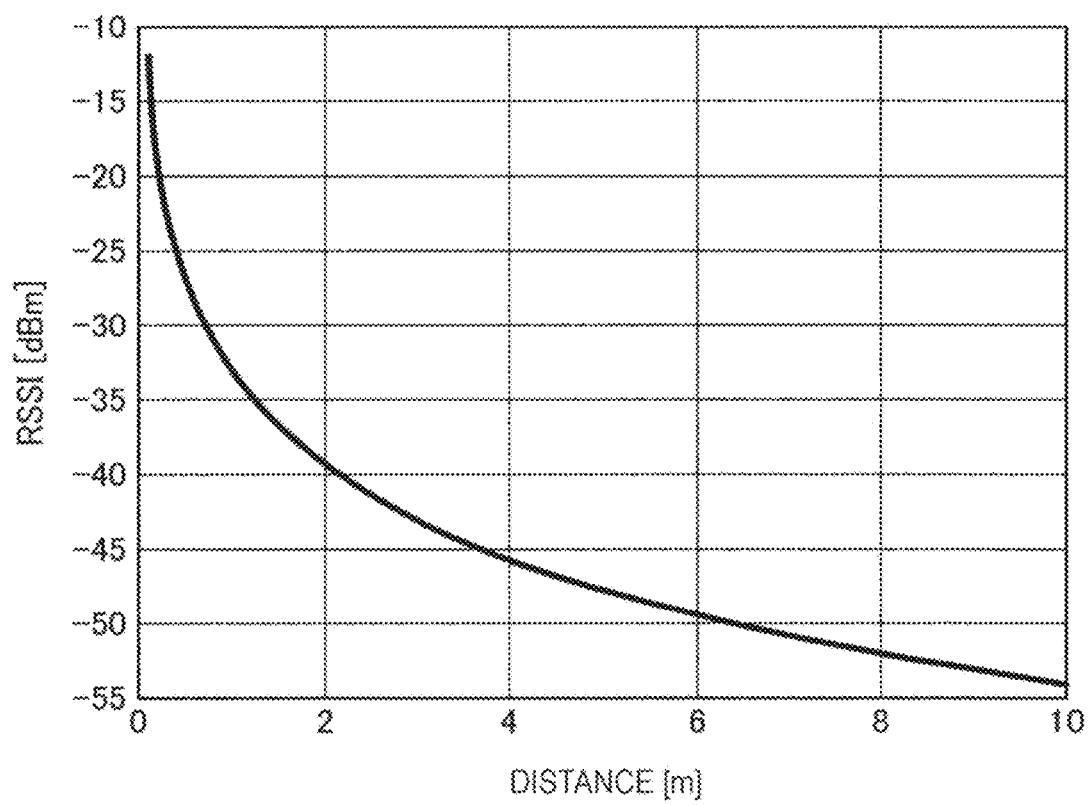
FIG. 6 is a graph illustrating relation between RSSI values representing reception signal strength and distance between two wearable terminals that have made near-field communication.

Alternatively, the near-field communication 140 may calculate distance between a wearable terminal 10 and another wearable terminal 10 on the basis of radio field strength at the time of receiving various kinds of information including identification information from the another wearable terminal 10. For example, in the case where the near-field communication unit 140 establishes near-field communication using Bluetooth, Bluetooth includes a received signal strength indication (RSSI) value indicating received signal strength. By using the RSSI value, it is possible to estimate distance between the two wearable terminals 10 that have established near-field communication. The following equation 4 is a conversion equation in this case. In addition, FIG. 6 is a graph illustrating the equation 4. In the equation 4, d represents distance between the two wearable terminals 10, RSSI represents the received signal strength, $d_0$ represents distance in the case where a value of the RSSI is equal to a predetermined $RSSI_0$, and $\alpha$ represents a propagation loss index.

$$d = d_0 \cdot 10^{\frac{RSSI_0 - RSSI}{10 \cdot \alpha}} \qquad \text{Equation 4}$$

As represented by the equation 4 and illustrated in FIG. 6, the RSSI value is inversely proportional to the distance between two wearable terminals 10. Therefore, it is possible to estimate the distance between two wearable terminals 10 by using the RSSI value. Accordingly, it is possible for the information processing system to notify a user of information on distance from another user who the user is interacting with in the real world. Thereby, the user can recognize more accurately which of the individuals registered in the predetermined database corresponds to which of the other users around himself/herself.

(Information Processing Device 20)

For example, the near-field communication unit 210 is constituted by a communication circuit and an antenna whose communication method is the same as the above-described near-field communication 140. The near-field communication unit 210 establishes near-field communication with the wearable terminal 10. Specifically, the near-field communication unit 210 receives sound information collected by the microphone unit 110, information on a posture of a user and identification information that have been received from another wearable terminal 10. Here, the information on the posture of the user and the identification information are information received by the wearable terminal 10 from the another wearable terminal 10. The information on the posture of the user and the identification information do not include identification information of the wearable terminal 10 itself, or information on a posture of a user detected by the wearable terminal 10 itself.

A communication method used by the near-field communication unit 210 is the same as the above-described near-field communication unit 140. For example, the communication method may be Wi-Fi (registered trademark), ZigBee (registered trademark), Bluetooth (registered trademark), Bluetooth low energy (registered trademark), ANT (registered trademark), or ANT+(registered trademark).

The input unit 220 may be constituted by: an input device through which information is input, such as a touchscreen, a keyboard, a button, a microphone, a switch, or a lever; an input control circuit configured to generate an input signal on the basis of user input and to output the signal to the control unit 230; and the like. The user can input various kinds of information to the information processing device 20 through the input unit 220.

The control unit 230 is constituted by a central processing unit (CPU) serving as an arithmetic processing unit, a read only memory (ROM) in which a control program, a control parameter, and the like are stored, and a random access memory (RAM) in which a program to be used for operation, parameters that arbitrarily change, and the like are temporarily stored. The control unit 230 controls the respective structural elements in the information processing device 20. Specifically, the control unit 230 transmits, to the information processing server 30 via the connection unit 260, various kinds of information received from the wearable terminal 10 via the near-field communication unit 210. In addition, the control unit 230 controls the notification generation unit 240 such that the notification generation unit 240 generates notification to a user by using the various kinds of information received from the wearable terminal 10 via the near-field communication unit 210 or the various kinds of information received from the information processing server 30 via the near-field communication unit 210.

The notification generation unit 240 generates notification to a user by using the various kinds of information received from the wearable terminal 10 via the near-field communication unit 210 or the various kinds of information received from the information processing server 30 via the near-field communication unit 210. Specifically, the notification generation unit 240 generates notification including interaction information indicating interaction with an individual specified by the information processing server 30.

For example, the interaction information may include personal information of the specified individual in the predetermined database, information on a history of interaction between the specified individual and the user, evaluation information indicating evaluation of the specified individual made by the user, or the like. For example, such information is stored in a predetermined database in the information processing server 30. In addition, the interaction information may include information on a posture of the specified individual, voice information of the specified individual, information on distance between the specified individual and the user, and the like. For example, such information is collected or received by the wearable terminal 10.

The form of the notification generated by the notification generation unit 240 may be appropriately changed in accordance with the form of the notification unit 250. For example, in the case where the notification unit 250 is a display device, the notification generation unit 240 may generate an image to be displayed on the notification unit 250. In the case where the notification unit 250 is a sound output device, the notification generation unit 240 may generate a sound signal to be played by the notification unit 250. Note that, details of the image to be generated by the notification generation unit 240 in the case where the notification unit 250 is the display device will be described later in <3. Example of display for user>.

The notification unit 250 includes a display device such as a liquid crystal display (LCD) device, an organic electroluminescent display (OLED) device, or a lamp, and a sound output device such as a loudspeaker or headphones. For example, in the case where the notification unit 250 is the display device or the like, the notification unit 250 lights or displays an image on the basis of a signal generated by the notification generation unit 240. Alternatively, in the case where the notification unit 250 is the sound output device, the notification unit 250 outputs sound on the basis of a signal generated by the notification generation unit 240.

In addition, the notification unit 250 is not specifically limited as long as the notification unit 250 can stimulate a sense organ of a user in some way. For example, the notification unit 250 may be a vibrator.

For example, the connection unit 260 is constituted by a communication circuit or an interface configured to connect with the network 40. The connection unit 260 transmits/receives information to/from the information processing server 30 via the network 40. For example, the connection unit 260 may be constituted by a communication circuit or an interface that can connect with a LAN, a WAN, the Internet, a satellite communication network, a telephone network, a mobile communication network, an IP-VPN, or the like. However, since the information processing device 20 is carried by a user in many cases, it is preferable that the connection unit 260 be an interface that can establish wireless communication.

Specifically, the connection unit 260 transmits sound information around the wearable terminal 10, identification information of another wearable terminal 10, and the like to the information processing server 30. The identification information is received by the wearable terminal 10. In addition, the connection unit 260 receives information on an individual from the information processing server 30. The information on the individual is specified from the sound information around the wearable terminal 10 and the identification information of the another wearable terminal 10 received by the wearable terminal 10.

(Information Processing Server 30)

For example, the connection unit 310 is constituted by a communication circuit or an interface configured to connect with the network 40. The connection unit 310 transmits/receives information to/from the information processing device 20 via the network 40. For example, in a way similar to the connection unit 260, the connection unit 310 may be constituted by a communication circuit or an interface that can connect with a LAN, a WAN, the Internet, a satellite communication network, a telephone network, a mobile communication network, an IP-VPN, or the like.

Specifically, the connection unit 310 receives sound information around the wearable terminal 10, identification information of another wearable terminal 10, and the like from the information processing device 20. The identification information is received by the wearable terminal 10. In addition, the connection unit 310 transmits information on the individual specified by the specification unit 320 from a predetermined database, to the information processing device 20.

The specification unit 320 specifies an individual registered in the predetermined database on the basis of identification information of another wearable terminal 10 received by a wearable terminal 10, and sound information collected by the wearable terminal 10. Note that, the specification unit 320 and the interaction information generation unit 330 are constituted by a CPU serving as an arithmetic processing unit, a ROM in which a control program, a control parameter, and the like are stored, and a RAM in which a program to be used for operation, parameters that arbitrarily change, and the like are temporarily stored.

Specifically, the specification unit 320 specifies an individual associated with the received identification information of the wearable terminal 10, from the predetermined database. In addition, the specification unit 320 specifies an individual who is speaking by performing voiceprint analysis on speech voice included in collected sound information. Note that, for example, it is only necessary for the voiceprint information for identifying voice of each user that is used for the voiceprint analysis, to be registered in advance in the predetermined database or the like.

Figure 7:
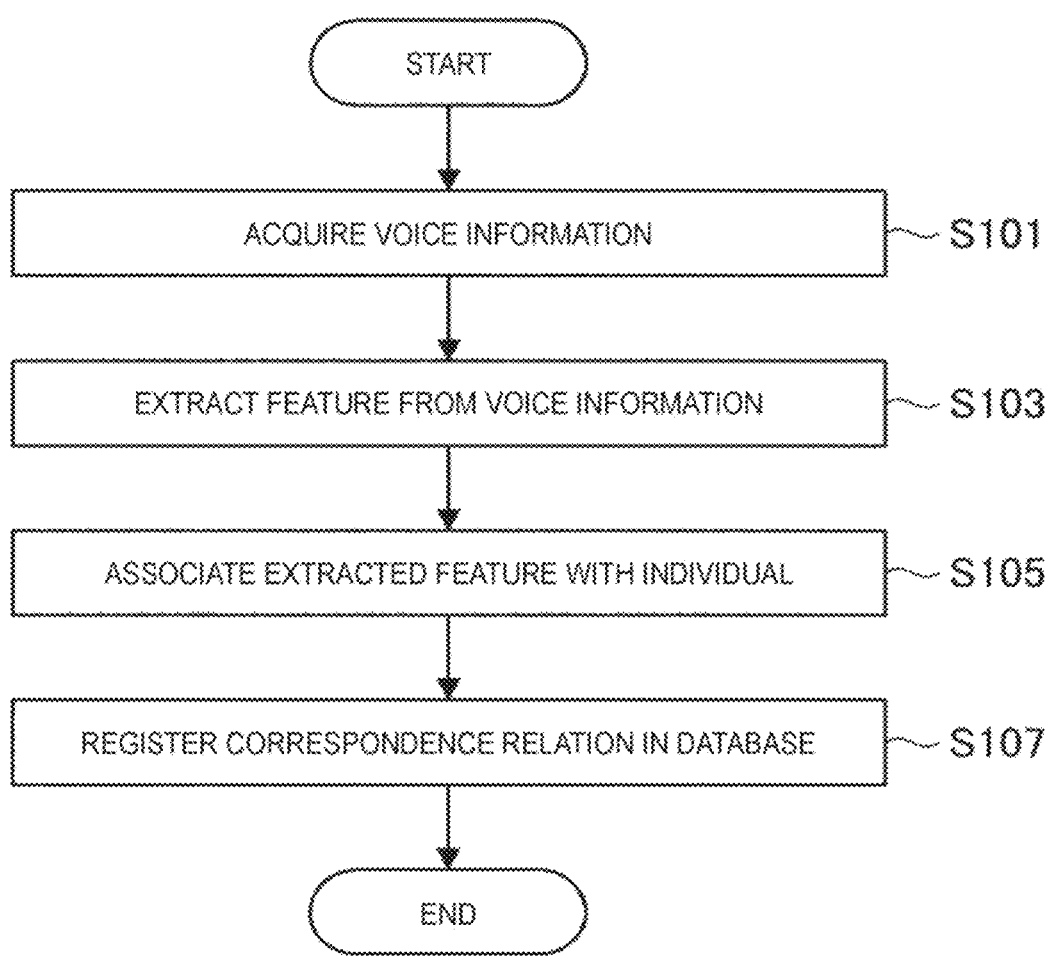
FIG. 7 is a flowchart illustrating workflow of extraction of voiceprint information from voice of a user.
Figure 8:
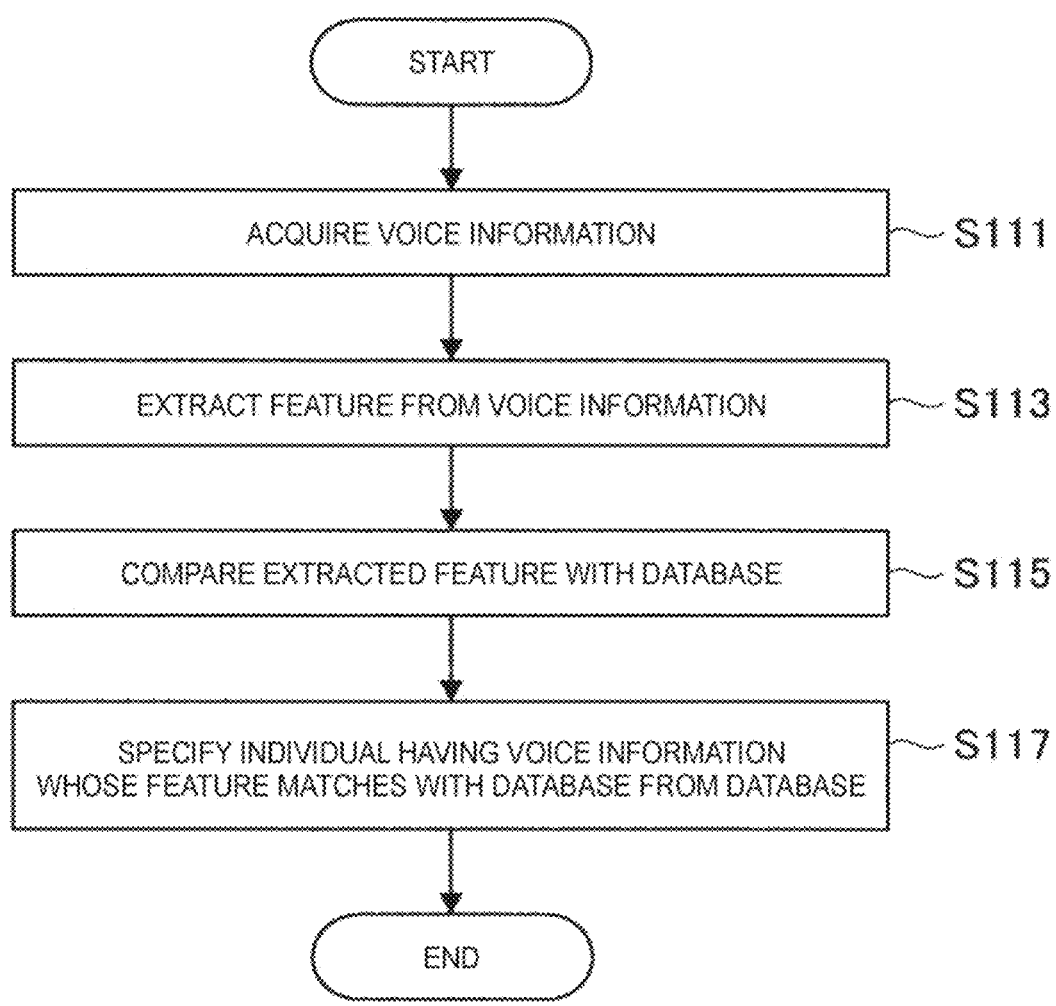
FIG. 8 is a flowchart illustrating workflow of specification of an individual corresponding to voice information by using voiceprint information.
Figure 9:
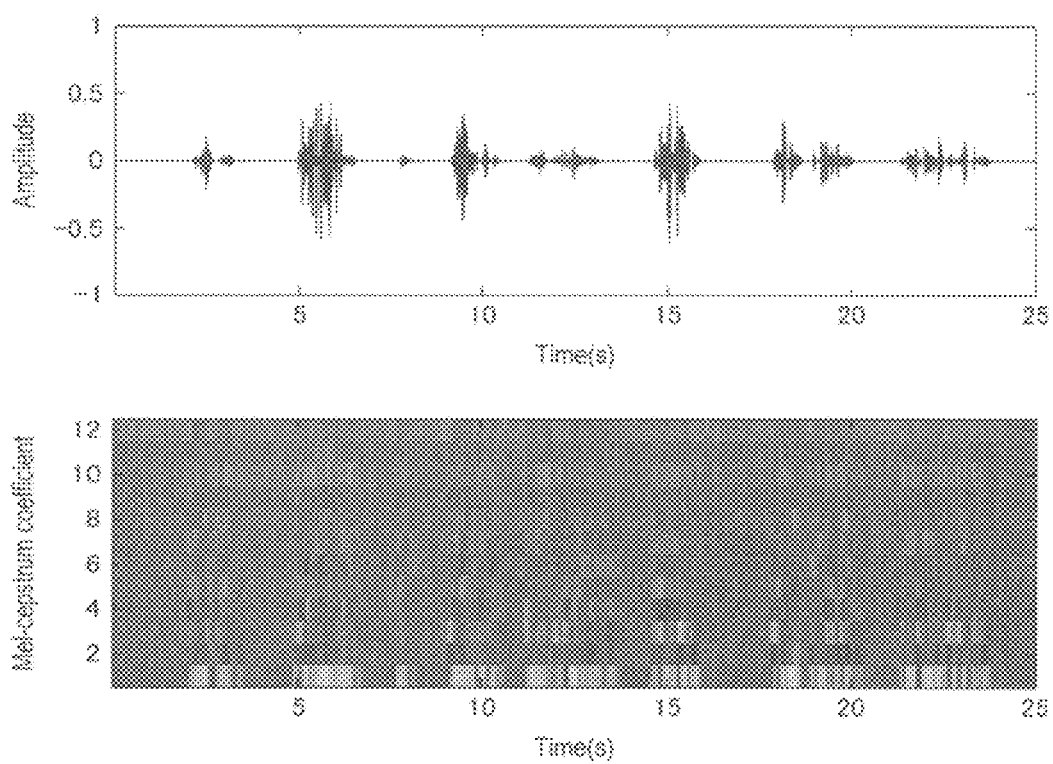
FIG. 9 is an explanatory diagram illustrating the Mel-Frequency Cepstrum Coefficient method for extracting features from voice information.

Note that, the voiceprint information and the like can be extracted from sound on the basis of the flowchart illustrated in FIG. 7. In addition, voice can be identified by using the voiceprint information on the basis of the flowchart illustrated in FIG. 8. FIG. 7 is a flowchart illustrating workflow of extraction of voiceprint information from voice of a user, and FIG. 8 is a flowchart illustrating workflow of specification of an individual corresponding to voice information by using voiceprint information. In addition, FIG. 9 is an explanatory diagram illustrating the Mel-Frequency Cepstrum Coefficient method for extracting features from sound information.

In the case of extracting voiceprint information from voice of a user, it is possible to acquire voice information of the user by causing the user to speak a fixed phrase in advance at the time of registration of a social networking service or the like as illustrated in FIG. 7 (S101). Next, a feature is extracted from the voice information of the user (S103). For example, a Mel-frequency cepstrum coefficient is used as the feature extracted from the voice information. Here, FIG. 9 illustrates correspondence relation between speech waves and Mel-frequency cepstrum coefficients extracted from the speech waves. FIG. 9 illustrates an example in which the speech waves are converted by using the mel scale and represented by 12 Mel-frequency cepstrum coefficients. Next, the features such as the extracted Mel-frequency cepstrum coefficients are associated with the user of the voice information (S105), and then the features are registered in the predetermined database or the like (S107). Note that, the features such as the Mel-frequency cepstrum coefficients extracted from the voice information correspond to so-called voiceprint information.

In addition, accuracy of the voiceprint information such as the Mel-frequency cepstrum coefficients registered in the predetermined database may be improved by using machine learning or the like. Specifically, the information processing server 30 may improve the accuracy of the voiceprint information registered in the predetermined database by causing each wearable terminal 10 and each information processing device 20 to acquire voice information of the user during daily use of the terminal/device and extract the feature from the acquired voice information of the user.

For example, it is possible for the wearable terminal 10 to identify voice of a user who is wearing the wearable terminal 10 since an output source of the voice is very close to the wearable terminal 10. Therefore, it is possible for the wearable terminal 10 to selectively collect the voice of the user and use the voice for machine learning of the voiceprint information registered in the predetermined database. Alternatively, in the case where the information processing device 20 is a smartphone, it is possible for the information processing device 20 to selectively collect the voice of the user by collecting voice of the user during talking on the smartphone, and use the collected voice for the machine learning of the voiceprint information registered in the predetermined database.

On the other hand, in the case of specifying an individual corresponding to voice information by using voiceprint information, first, voice information to be identified is acquired via the connection unit 310 as illustrated in FIG. 8. (S111). Next, a feature is extracted from the voice information (S113). Specifically, as the feature, a Mel-frequency cepstrum coefficient is extracted from the voice information. Next, the Mel-frequency cepstrum coefficient extracted from the voice information is compared with the respective Mel-frequency cepstrum coefficients registered in the predetermined database (S115), and an individual whose Mel-frequency cepstrum coefficient is determined to match with the Mel-frequency cepstrum coefficient registered in the predetermined database is specified from the predetermined database (S117).

For example, as the comparison between the Mel-frequency cepstrum coefficients at this time, the minimum distance classification can be used. Here, the minimum distance classification will be described. A mean square difference MSD between $C_t$ and $C_g$ is represented by the following equation 5, where $C_t$ represents a Mel-frequency cepstrum coefficient extracted from the voice information, and $C_g$ represents the Mel-frequency cepstrum coefficient of the voiceprint information registered in the predetermined database. Note that, $C_t$ is a value averaged in a time region, and R is the number of Mel-frequency cepstrum coefficients.

$$MSD = \frac{1}{R-1} \sum_{n=1}^{R-1} (C_t[n] - C_g[n])^2 \qquad \text{Equation 5}$$

In the case where the mean square difference MSD calculated by using the equation 5 is smaller than a threshold, the specification unit 320 determines that the voiceprint information match with each other, and it is possible to specify an individual who has output the voice included in the voice information. Note that, for example, an appropriate threshold by which match between the voiceprint information is determined can be appropriately set through experiments.

Accordingly, it is possible for the specification unit 320 to specify an individual who the user is interacting with in the real world from the predetermined database by checking the voiceprint information or the like of the voice included in the collected sound information against the registered voiceprint information even in the case where identification information of the plurality of the wearable terminals 10 are received.

Note that, although FIG. 2 illustrates the configuration example in which the specification unit 320 is included in the information processing server 30, the technology related to the embodiment of the present disclosure is not limited thereto. For example, the specification unit 320 may be included in the information processing device 20. In such a case, collected voice information of another user is not transmitted to the information processing server 30. Therefore, it is possible to specify an individual while paying attention to privacy of users. On the other hand, in the case where the specification unit 320 is included in the information processing server 30, it is possible to improve speed of a voiceprint analysis process of voice information since the information processing server 30 has high processing performance.

The database storage unit 340 is constituted by a storage device such as a hard disc drive (HDD) device or a solid state drive (SSD) device. The database storage unit 340 stores a predetermined database in which personal information and the like of each user are registered. Specifically, the database storage unit 340 may store a database in which at least profile information including a name, a career, affiliation, self-introduction, and the like of a user, and information on interaction histories including date, place, time of interaction between a user and another user, and the like are registered. For example, such a database may be used by a social networking service that supports interaction between users on a network.

The interaction information generation unit 330 generates interaction information related to the individual specified by the specification unit 320 on the basis of the information stored in the database storage unit 340. In addition, for example, the generated interaction information is presented to a user through the notification unit 250 of the information processing device 20 or the like. Note that, the interaction information generation unit 330 is constituted by a CPU serving as an arithmetic processing unit, a ROM in which a control program, a control parameter, and the like are stored, and a RAM in which a program to be used for operation, parameters that arbitrarily change, and the like are temporarily stored.

Here, the interaction information is information on another user who a user is interacting with in the real world. Specifically, the interaction information includes at least information on the individual specified by the specification unit 320. In addition, the interaction information may include information on a posture of another user received by the wearable terminal 10, information on distance from another user that has been estimated from radio field strength of near-field communication received by the wearable terminal 10, information on sound collected by the wearable terminal 10, or information on a cardinal direction in which the sound collected by the wearable terminal 10 has been output. In the case where the interaction information includes such information, the user can surely identify another user specified by the specification unit 320 in the real world. In addition, the user can know details of the another user specified by the specification unit 320.

In addition, the interaction information may include information on an interaction history between a user and another user. For example, the interaction history may include date/time and place at which the user has met the another user in the real world, interaction duration, sound information at the time of the interaction, or information on a posture, a direction, and distance of the another user at the time of the interaction. In the case where the interaction information includes information on the interaction history between the user and the another user, the user can get deepen exchange with the another user by referring to past interaction.

In addition, the interaction information may include evaluation information indicating evaluation of the another user made by the user. For example, the evaluation information may be a point given from the another user to the user in a predetermined or external social networking service or the like, which indicates a favorable impression, goodwill, or admiration for the user. In the case where the interaction information includes such evaluation information, the user can decide reputation or evaluation of the another user in the social networking service on the basis of the evaluation information. In addition, the evaluation information may include negative evaluation of the another user such as warning or disagreement.

3. EXAMPLE OF DISPLAY FOR USER

Next, with reference to FIG. 10 to FIG. 14, first to third display examples that are display examples displayed on the notification unit 250 in the case where the notification unit 250 of the information processing device 20 according to the embodiment is a display device will be described.

3.1. First Display Example

Figure 10:
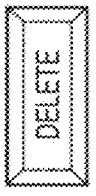
FIG. 10 is an explanatory diagram illustrating a first display example displayed on a notification unit serving as a display device.

First, with reference to FIG. 10 and FIG. 11, the first display example will be described. FIG. 10 and FIG. 11 are each an explanatory diagram illustrating a first display example displayed on the notification unit 250 serving as the display device.

As illustrated in FIG. 10 and FIG. 11, for example, interaction information between a user B and a user C is displayed in the first display example in the case where the wearable terminal 10 receives identification information of wearable terminals 10 corresponding to the user B and the user C.

Specifically, in the display example illustrated in FIG. 10 and FIG. 11, an "interaction history" indicating date and time when the users have interacted with each other last time, a "voice direction" indicating directions in which voice of the users have been output, a "posture" indicating postures of the users, a "play button" for playing voice information of the users collected by the wearable terminals 10, an "evaluation button" for making evaluation of the users, and a "delete button" for deleting the interaction histories with the users are displayed.

In the display example illustrated in FIG. 10, date and time of previous interaction is displayed in the "interaction history" of the user C since the user has not interacted with the user B before but has interacted with the user C. Note that, if the user wants to delete the interaction history with the user C, the user can delete the interaction history with the user C by pressing the "delete button".

In addition, in the display example illustrated in FIG. 10, information indicating the postures of the user B and the user C that have been detected by the posture sensor units 120 of the wearable terminals 10 worn by the user B and the user C is displayed in the "posture". By referring to the "posture", the user can check the postures of the user B and the user C in the real world against the postures of the respective users illustrated in the display example. Therefore, it is possible to easily determine which of the users in the real world corresponds to the users illustrated in the display example.

Note that, in the display example illustrated in FIG. 10, the user B or the user C have not spoken yet, the wearable terminal 10 has not collected voice information. Therefore, the "voice direction" or the "play button" is not displayed.

Here, in the case where the user starts interaction with the user B and the wearable terminal 10 collects voice output from the user B, the display example illustrated in FIG. 10 transitions to the display example illustrated in FIG. 11.

When the voice information is collected, the "interaction history", "voice direction", "play button", "evaluation button", and "delete button" related to the user B are newly displayed in the display example illustrated in FIG. 11. Note that, the date and time displayed in the interaction history" related to the user B may be date and time when the voice information including the voice of the user B has been collected.

In addition, by pressing the "play button", the user can play the collected voice of the user B. If the voice played back by pressing the "play button" is not the voice of the user B, the user can delete the collected voice information and the interaction history by pressing the "delete button". Thereby, it is possible to improve accuracy of individual identification using the voice information.

In addition, in the case where the user wants to make positive evaluation of the user B who the user has interacted with, the user can make the positive evaluation of the user B by pressing the "evaluation button". For example, the evaluation made by the user is stored in the predetermined database stored by the information processing server 30, and the evaluation information of the user B is updated.

In addition to input through the input unit 220 such as press of the "evaluation button", the user may make the evaluation of the user B who the user has interacted with through recognition of speech of specific keywords such as "nice", "thank you", or "great" by using a speech recognition technology, for example. In addition, the user may make the evaluation of the user B who the user has interacted with through recognition of a specific gesture movement of a body to which the wearable terminal 10 is attached. In such a case, the user can make evaluation of another user who the user has interacted with through natural speech or movement without allowing the another user who the user is interacting with to recognize the evaluation.

Note that, it is also possible to review the display examples illustrated in FIG. 10 and FIG. 11 as the history, not only while the wearable terminal 10 is receiving identification information of another wearable terminal 10, but also after the interaction between the users in the real world finishes. This enables the user to correct erroneous information or the like that the user has not noticed during the interaction in the real world.

3.2. Second Display Example

Figure 12:
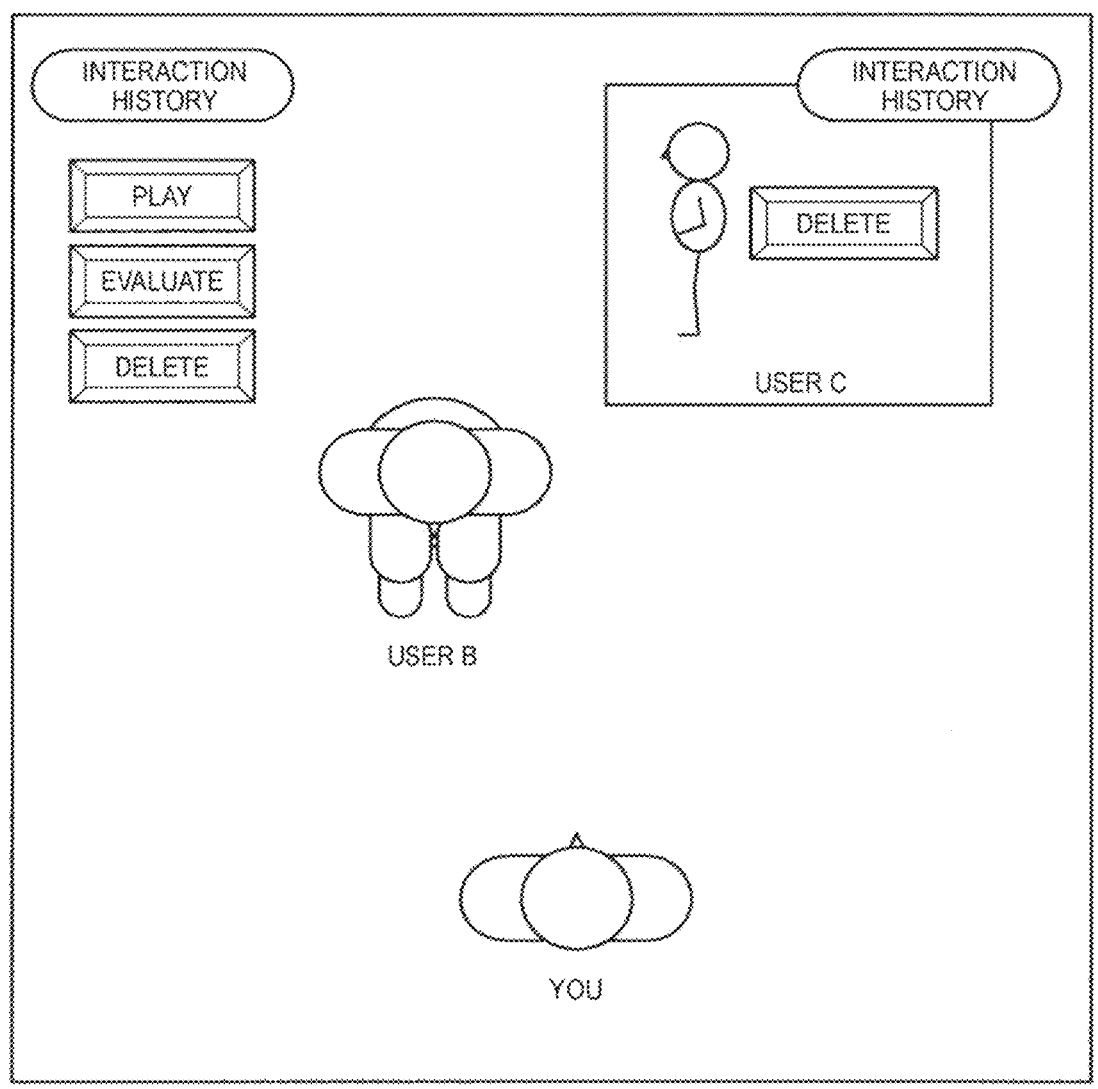
FIG. 12 is an explanatory diagram illustrating a second display example displayed on a notification unit serving as a display device.
Figure 13:
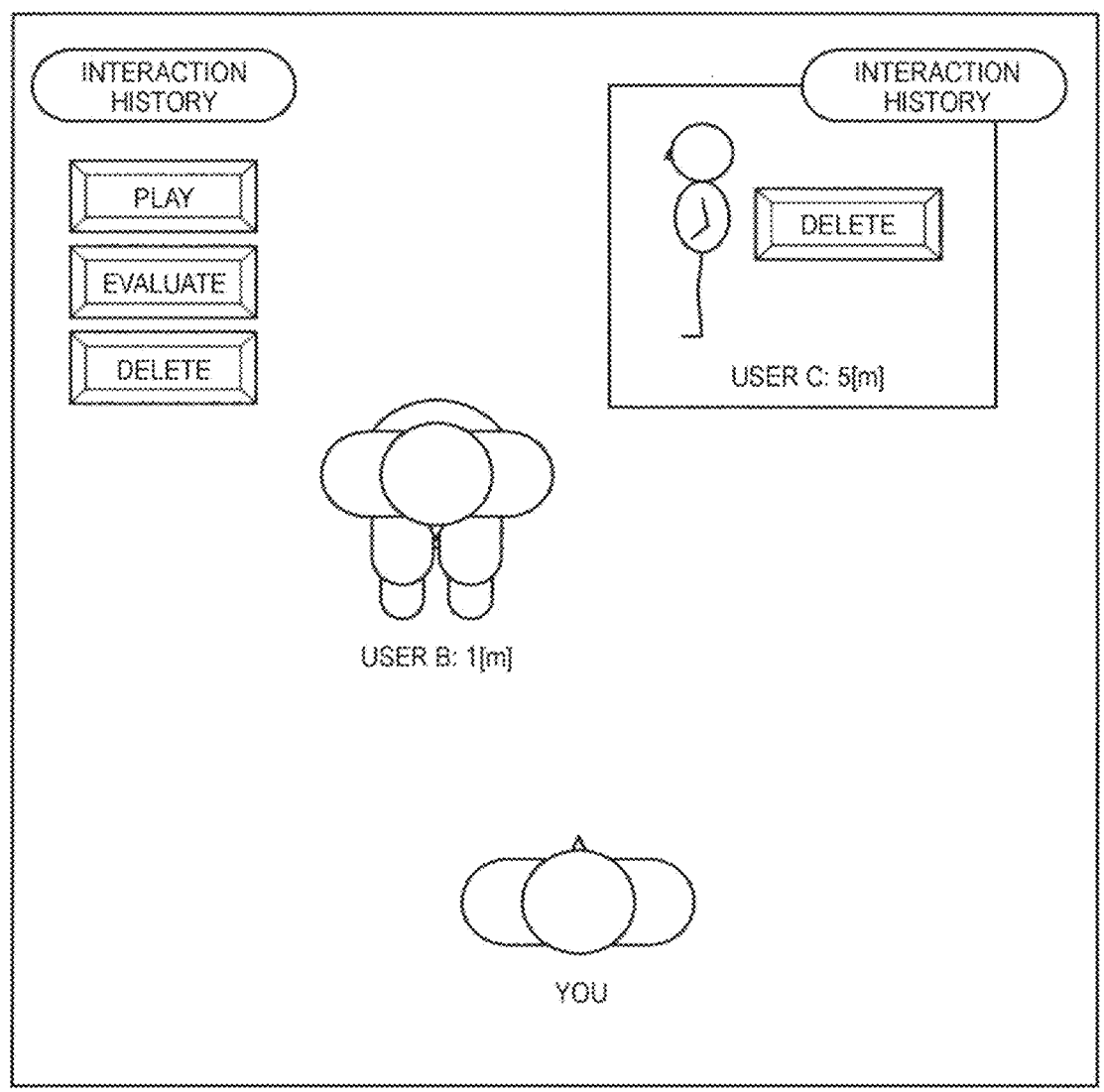
FIG. 13 is an explanatory diagram illustrating a second display example displayed on a notification unit serving as a display device.

Next, with reference to FIG. 12 and FIG. 13, the second display example will be described. FIG. 12 and FIG. 13 are each an explanatory diagram illustrating the second display example displayed on the notification unit 250 serving as the display device.

As illustrated in FIG. 12 and FIG. 13, for example, interaction information between a user B and a user C is displayed in the second display example in the case where the wearable terminal 10 receives identification information of wearable terminals 10 corresponding to the user B and the user C. Contrary to the first display example, the interaction information is displayed without using letters or the like but using illustrations or signs in the second display example. This enables the user to recognize statuses of other users more intuitively.

Specifically, in the display example illustrated in FIG. 12 and FIG. 13, images representing the user B and the user C are displayed at positions reflecting postures and voice directions of the respective users. In addition, "interaction history buttons" for displaying interaction histories indicating date and time when the users have interacted with other users last time, a "play button" for playing voice information of the user collected by the wearable terminal 10, an "evaluation button" for making evaluation of the user, and "delete buttons" for deleting the interaction histories with the users are displayed around the images representing the user B and the user C.

In addition, in contrast to the display example illustrated in FIG. 12, the display example illustrated in FIG. 13 displays images indicating distance between the user (in other words, you) and the other users (in other words, user B and user C). Here, the distances between the user and the other users are distances from the other users estimated from radio field strength of near-field communication received by the wearable terminal 10.

The display examples illustrated in FIG. 12 and FIG. 13 are each a display example in which the interaction with the user B starts and the wearable terminal 10 collects voice output by the user B (in other words, case corresponding to FIG. 11).

Therefore, in the display examples illustrated in FIG. 12 and FIG. 13, the user can play the collected voice of the user B by pressing the "play button" near the user B. If the voice played back by pressing the "play button" is not the voice of the user B, the user can delete the collected voice information and the interaction history by pressing the "delete button". Thereby, it is possible to improve accuracy of individual identification using the voice information. In addition, in the case where the user wants to make positive evaluation of the user B who the user has interacted with, the user can make the positive evaluation of the user B by pressing the "evaluation button".

On the other hand, in the display examples illustrated in FIG. 12 and FIG. 13, the wearable terminal 10 has not collected the voice output from the user C. Therefore, the images of the "play button" and the "evaluation button" are not displayed near the image of the user C. In addition, since the voice output from the user C has not been collected and the direction in which the voice has been output is unknown, the image of the user C is displayed in a box such that the display does not reflect positional relation between the user (in other words, you) and the user C in the real world. In such a case, the image of the user C merely indicates that the user C is in somewhere near the user (in other words, you).

In addition, in the display example illustrated in FIG. 12 and FIG. 13, the image of the user B is an image of a "sitting" state that reflects the posture of the user B detected by the posture sensor unit 120 of the worn wearable terminal 10. On the other hand, the image of the user C is an image of a "standing" state that reflects the posture of the user C detected by the posture sensor unit 120 of the worn wearable terminal 10. By referring to the postures, the user can check the postures of the user B and the user C in the real world against the postures of the respective users illustrated in the display example. Therefore, it is possible to easily determine which of the users in the real world corresponds to the users illustrated in the display example.

Note that, it is also possible to review the display examples illustrated in FIG. 12 and FIG. 13 as the history, not only while the wearable terminal 10 is receiving identification information of another wearable terminal 10, but also after the interaction between the users in the real world finishes. This enables the user to correct erroneous information or the like that the user has not noticed during the interaction in the real world.

3.3. Third Display Example

Figure 14:
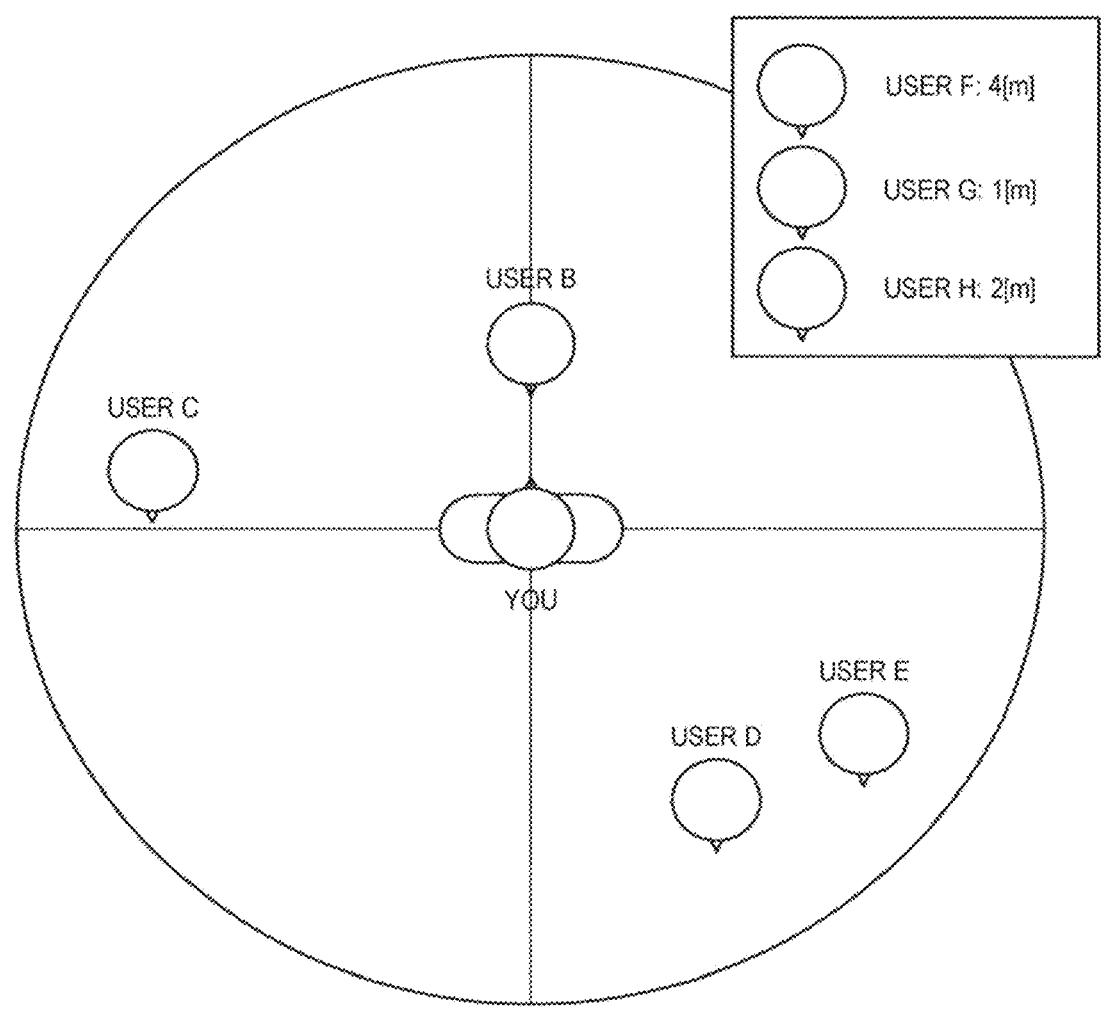
FIG. 14 is an explanatory diagram illustrating a third display example displayed on a notification unit serving as a display device.

Next, with reference to FIG. 14, the third display example will be described. FIG. 14 is an explanatory diagram illustrating the third display example displayed on the notification unit 250 serving as the display device.

As illustrated in FIG. 14, for example, positional relation between the user (in other words, you) and respective users B to H is displayed in the third display example in the case where the wearable terminal 10 receives identification information of wearable terminals 10 corresponding to the respective users B to H. By referring to the positional relation, the user can intuitively recognize positional relation with the respective users B to H in the real world. Therefore, it is possible to easily determine which of the users in the real world corresponds to the users illustrated in the display example.

Specifically, positions between the user (in other words, you) and the users B to E of which identification information of the corresponding wearable terminals 10 and information of spoken voice have been acquired are determined by using distance calculated from radio field strength of signals including the identification information and cardinal directions in which the voice has been output. Therefore, according to the third display example, it is possible to provide information on the specified individuals in the form of an image of a circle centered on the user (in other words, you) that reflects the positional relation with the respective users in the real world. Note that, the users F to H of which identification information of the corresponding wearable terminals 10 have only been received are displayed in a box or the like such that the display does not reflect positional relation in the real world.

In addition, it is also possible to show the display reflecting the positional relation between the respective users in the real world such that histories are arranged in chronological order. This enable visually providing information indicating ways the respective users have moved and with whom the user has interacted inside a predetermined space (for example, in a room) during a certain period of time. Therefore, according to the technology of the embodiment of the present disclosure, it is possible to acquire positional coordinates of the respective other users around the user in the real world. That is, it is also possible to recognize motions of the respective users in the predetermined space (for example, in the room) by converting the positional coordinates of the respective other users into coordinates based on the room or the like. Note that, for example, such histories of the display may be stored in the database storage unit 340 of the information processing server 30.

4. OPERATION EXAMPLE OF INFORMATION PROCESSING SYSTEM

Figure 15A:
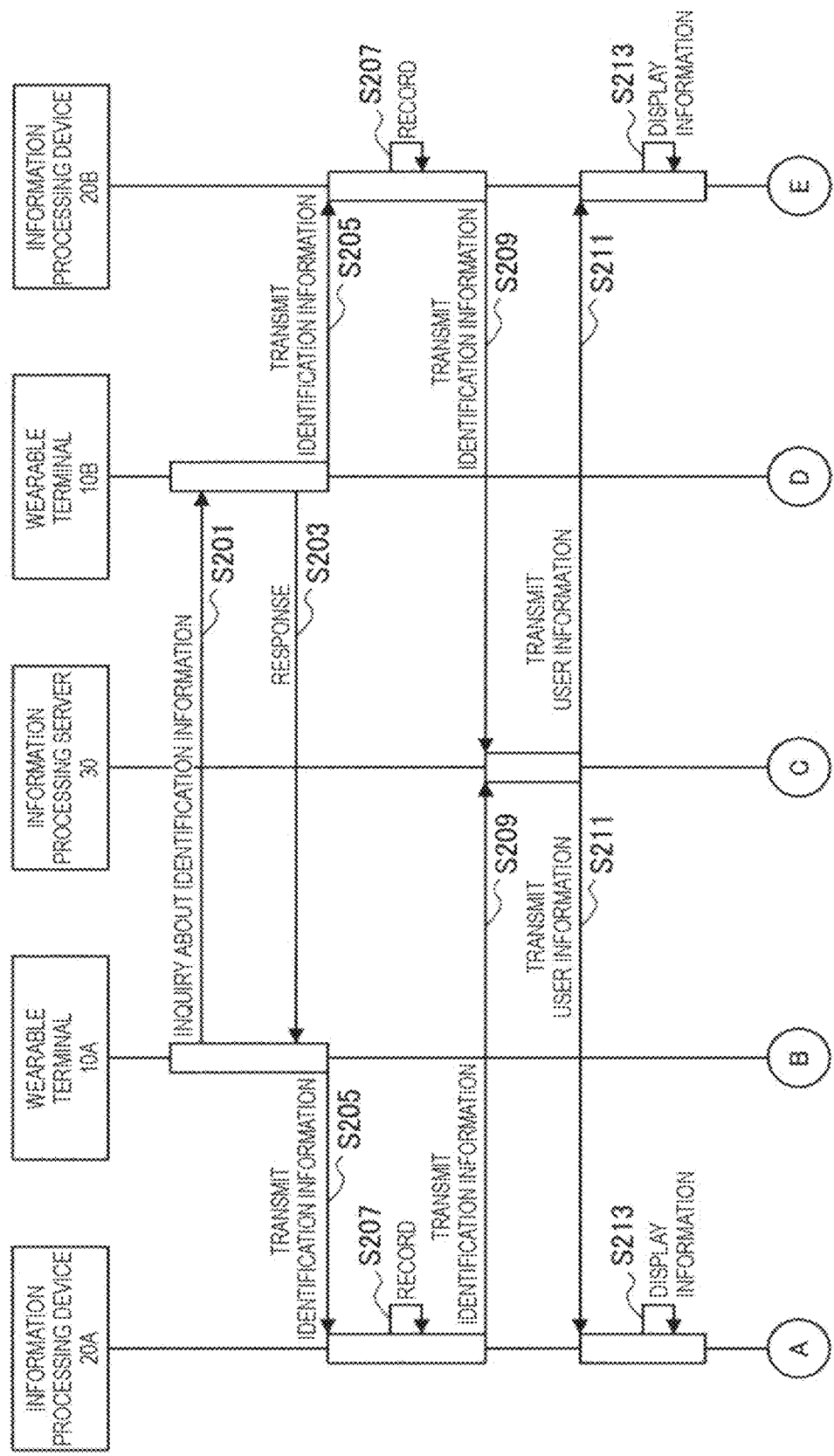
FIG. 15A is a sequence diagram illustrating operation of an information processing system before collecting a speech of a user.
Figure 16:
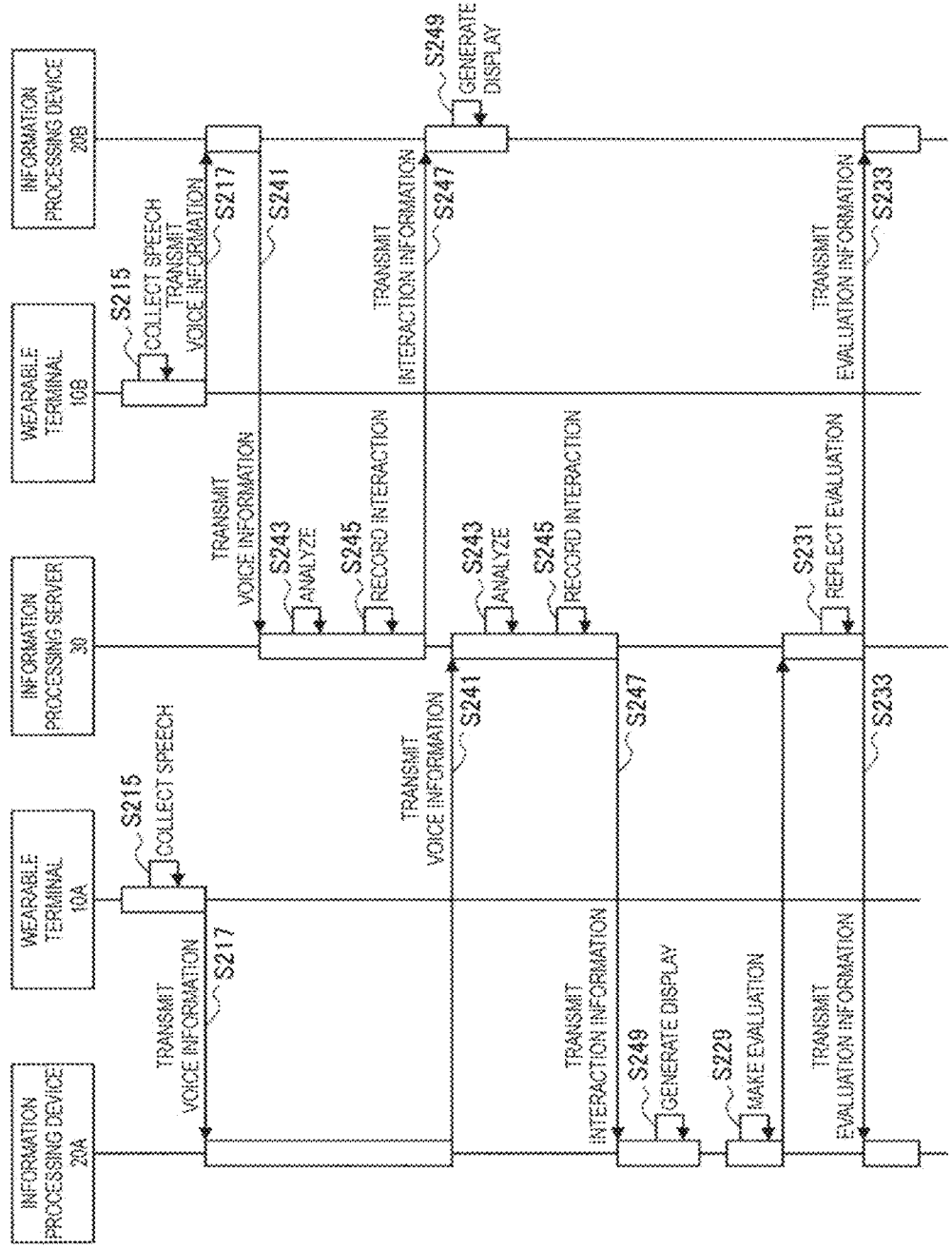
FIG. 16 is a sequence diagram illustrating a case where an information processing device analyzes a voiceprint in voice information.

Next, with reference to FIG. 15A to FIG. 16, an operation example of the information processing system according to the embodiment will be described. FIG. 15A is a sequence diagram illustrating operation of the information processing system before collecting a speech of a user. In addition, FIG. 15B and FIG. 16 are each a sequence diagram illustrating operation of the information processing system after collecting the speech of the user. Note that, FIG. 15B is a sequence diagram in the case where the information processing server 30 analyzes voiceprints of the sound information, and FIG. 16 is a sequence diagram in the case where the information processing device 20 analyzes the voiceprints of the sound information.

For example, it is assumed that the user A, the user B, the user C, and other people are in a train. The user A, the user B, and the user C are registered in a social networking service that supports the technology according to the embodiment, but they don't know each other by sight. Under such a situation, the user B sitting down in a seat gives his seat to the user A. The user A says thank you to the user B, and the user A makes evaluation of the user B in the social networking service. In such a case, the information processing system according to the embodiment operates as follows.

Specifically, as illustrated in FIG. 15A, the wearable terminal 10A of the user A first makes an inquiry about identification information to check whether there is a wearable terminal registered in the same social networking service around the user A (S201). This inquiry is repeatedly made at a predetermined timing, and identification information of the wearable terminal 10A is transmitted together with the inquiry. The wearable terminal 10B responds to the inquiry, and transmits identification information of the wearable terminal 10B (S203). Note that, each of the identification information of the wearable terminal 10A and the identification information of the wearable terminal 10B includes information on a posture of each of the users A and B.

Each of the wearable terminals 10A and 10B that have found other wearable terminals 10 transmits the received identification information and the information of the posture of the user to the information processing device 20A and 20B (S205). Each of the information processing devices 20 A and 20B that have received the information stores the received information in its memory or the like (S207), and transmits the received identification information of the wearable terminal and the information on the posture of the user to the information processing server 30 (S209). The information processing server 30 searches the database of the social networking service for user information corresponding to the received identification information of the wearable terminals 10, and transmits the found user information to the information processing devices 20 (S211). The information processing devices 20 may display the received user information in the form of the first to third display example, or the like (S213). In this case, the user information may include information for specifying voice of users (in other words, voiceprint information), interaction history information with the user A and the user B, and the like.

Here, it is assumed that, the user B has given his seat to the user A, the user B has said "please take my seat" to the user A, and the user A has said "thank you" to the user B.

In the case where each of the information processing devices 20A and 20B analyzes a voiceprint, the microphone units 110 of the wearable terminals 10A and 10B collect speech of the users A and B as illustrated in FIG. 15B (S215). The collected voice information is transmitted to the information processing devices 20A and 20B (S217), and the information processing devices 20A and 20B analyze the voiceprints of the received voice information (S219). For example, the voiceprint information used at that time may be included in the user information transmitted in Step S211.

The information processing devices 20A and 20B transmits respective analysis results of the voice information to the information processing server 30 (S221), and the information processing server 30 registers the received analysis results of the voice information as events in the database of the social networking service stored in the database storage unit 340 (S223). After the registration, the information processing server 30 transmits the registered interaction information to the respective information processing devices 20A and 20B (S225), and each of the information processing devices 20A and 20B displays the received interaction information in the form of the first to third display examples or the like (S227).

Here, in the case where the user A has made the evaluation to the user B who has given his seat to the user A (S229), information indicating that the evaluation has been made is transmitted to the information processing server 30. Subsequently, the information processing server 30 reflects the made evaluation to the database of the social networking service, and updates evaluation information of the user B (S231). After updating the evaluation information, the information processing server 30 transmits the updated evaluation information to each of the information processing devices 20A and 20B (S233).

Note that, as illustrated in the first to second display examples, the evaluation may be made by pressing the "evaluation button" displayed on the information processing device 20, or may be made by registering a comment such as "thank you" or "see you again".

On the other hand, in the case where the information processing server 30 analyzes the voiceprints, the microphone units 110 of the wearable terminals 10A and 10B collects speeches of the users A and B as illustrated in FIG. 16 (S215), and the collected voice information is transmitted to the respective information processing devices 20A and 20B (S217). The information processing devices 20A and 20B transmit the received voice information to the information processing server 30 (S241), and the information processing server 30 analyzes voiceprints in the received voice information (S243).

After the voiceprint analysis, the information processing server 30 registers the analysis results of the voice information as events in the database of the social networking service of the database storage unit 340 (S245). After the registration, the information processing server 30 transmits the registered interaction information to each of the information processing devices 20A and 20B (S247). Each of the information processing devices 20 displays the received interaction information in the form of the first to third display example or the like (S249).

Here, the operation in the case where the user A makes the evaluation of the user B who has given his seat to the user A (in other words, operation in Step S229 to Step S233) is the same as the operation illustrated in FIG. 15B. Therefore, description of the operation is omitted here.

According to the above described operation, a series of processes in the information processing system according to the embodiment finishes.

5. MODIFICATION

Next, with reference to FIG. 17 and FIG. 18, a modification of the information processing system according to the embodiment will be described. According to the modification of the embodiment, the wearable terminal 10 includes a sensor unit that is constituted by various sensors and a signal processing circuit. The wearable terminal 10 notifies a user or receives input from the user on the basis of information measured by the sensor unit.

First, with reference to FIG. 17, a configuration of the information processing system according to the modification of the embodiment will be described. FIG. 17 is a block diagram illustrating an internal configuration of a wearable terminal according to the modification. Note that, the configurations of the information processing device 20 and the information processing server 30 according to the modification are the same as FIG. 2, and the repeated description is omitted here.

Figure 17:
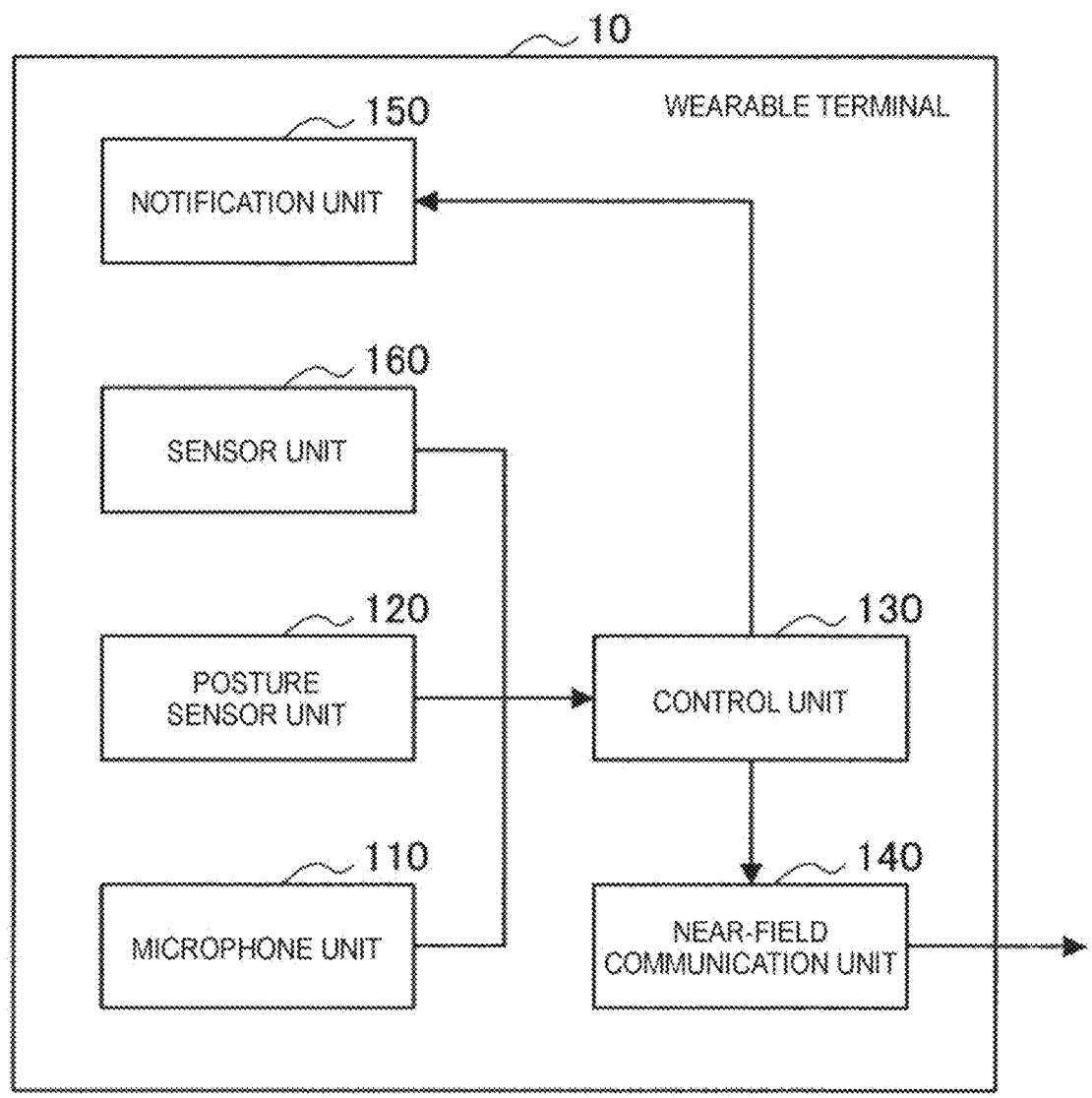
FIG. 17 is a block diagram illustrating an internal configuration of a wearable terminal according to a modification of the present disclosure.

As illustrated in FIG. 17, the wearable terminal 10 includes a microphone unit 110, a posture sensor unit 120, a control unit 130, a near-field communication unit 140, a sensor unit 160, and a notification unit 150. The microphone unit 110, the posture sensor unit 120, the control unit 130, and the near-field communication unit 140 are the same as the structural elements illustrated in FIG. 2, repeated descriptions thereof are omitted here.

For example, the sensor unit 160 is constituted by various sensors and a signal processing circuit. The sensor unit 160 measures information on an environment around the wearable terminal 10. The various sensor included in the sensor unit 160 may be a geomagnetic sensor, a barometric sensor, a temperature sensor, an illuminance sensor, a pulse wave sensor, a Global Navigation Satellite System (GNSS) sensor, or the like.

For example, to collect ambient sound, the wearable terminal 10 is preferable to be exposed to the outside. However, depending on the form of the wearable terminal 10, the wearable terminal 10 is sometimes hidden in a jacket, bag, or the like. Therefore, the sensor unit 160 may include the illuminance sensor such as a photo diode to determine whether the wearable terminal 10 is exposed to the outside or hidden in the jacket, back, or the like. This enables the sensor unit 160 to determine whether the wearable terminal 10 is in an environment appropriate to exhibit its functions. In the case where the wearable terminal 10 is not in the environment appropriate to exhibit its functions, the wearable terminal 10 may issue alert notification to a user through the notification unit 150 described later.

The notification unit 150 includes a display device such as an LCD device, an OLED device, or a lamp, a sound output device such as a loudspeaker or a buzzer, a vibrator, and the like. For example, the notification unit 150 may appropriately issue the alert notification or the like to the user in the case where the near-field communication unit 140 receives identification information of another wearable terminal 10, voiceprint analysis of the voice information is completed, evaluation of another user is made, or the wearable terminal 10 is not in an environment appropriate to exhibit its function such as sound collection. Note that, stimulus patterns or intensity of the alert notification may vary in accordance with types of the notification.

Next, with reference to FIG. 18, an operation example of the information processing system according to the modification will be described. FIG. 18 is a sequence diagram illustrating operation of the information processing system according to the modification after collecting a speech of a user. Note that, the operation before collecting the speech of the user according to the modification is the same as FIG. 15A, and the repeated description is omitted here.

For example, in the case where the user interacts with another user in the real world, sometimes gaze on the information processing device 20 is not appropriate. Therefore, the information processing system according to the modification operates as follows in the case where the information processing system notifies the user of information by using the notification unit 150 of the wearable terminal 10 without using the notification unit 250 of the information processing device 20.

Figure 18:
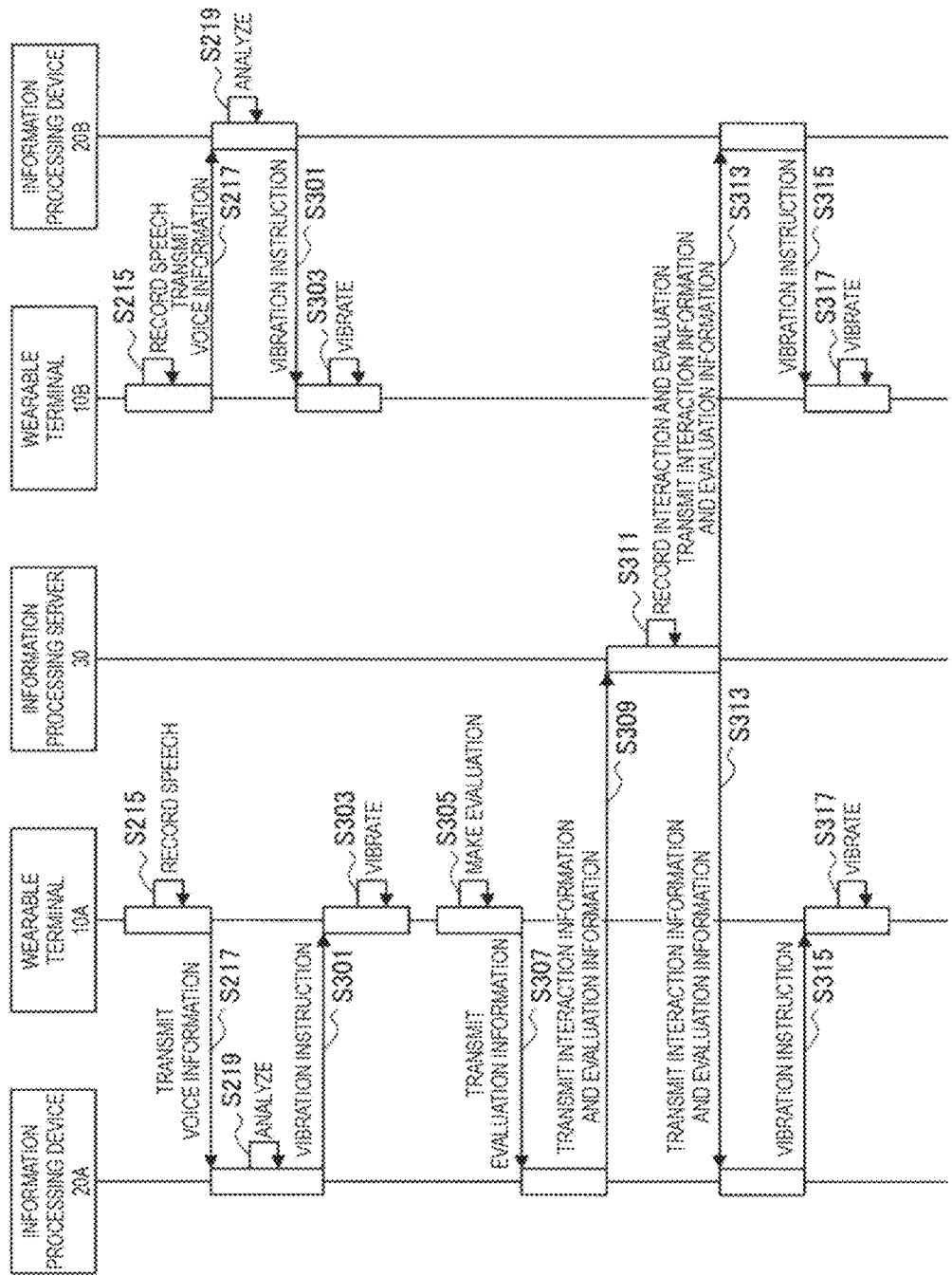
FIG. 18 is a sequence diagram illustrating operation of an information processing system according to a modification of the present disclosure after collecting a speech of a user.

For example, after the information processing server 30 transmits user information corresponding to the received identification information of the wearable terminal 10, the microphone units 110 of the wearable terminals 10A and 10B collect speeches of the users A and B as illustrated in FIG. 18 (S215). The collected voice information is transmitted to the respective information processing devices 20A and 20B (S217), and the information processing devices 20A and 20B analyze the voiceprint of the received voice information (S219). In the case where the voiceprint analysis of the voice information finishes, the information processing devices 20A and 20B instructs the wearable terminals 10A and 10B to issue a notification indicating that the voiceprint analysis has finished through vibration or the like (S301). The wearable terminals 10A and 10B that have received the vibration instruction notifies the user B that the voiceprint analysis has finished through vibration (S303).

In addition, in the case where the user A make the evaluation of the user B through the wearable terminal 10A by speaking a specific keyword or performing a specific gesture (S305), the information indicating that the evaluation of the user B has been made is first transmitted to the information processing device 20 (S307), and then transmitted to the information processing server 30 in addition to interaction information (S309). Subsequently, the information processing server 30 registers the interaction information and made evaluation in the database of the social networking service (S311), and transmits the registered interaction information and evaluation information to each of the information processing devices 20A and 20B (S313). In the case where the interaction information and the evaluation information have been received, the information processing devices 20A and 20B instruct the wearable terminals 10A and 10B to issue a notification indicating that the database has been updated through vibration or the like (S315). The wearable terminals 10A and 10B that have received the vibration instruction notify the users A and B that the database has been updated through vibration (S317).

Note that, it is preferable that the vibration in Step S303 have at least different vibration pattern or different vibration intensity from the vibration in Step S317. This enables the users A and B who have received vibration from the wearable terminals 10A and 10B to perceive a summary of notification content through the vibration patterns or vibration intensity. For example, the vibration in Step S303 causes the users A and B to perceive that the voiceprint analysis of voice of an interaction partner has finished. In addition, for example, the vibration in S317 causes the user A to understand that the evaluation of the user B has been made, and allows the user B to understand that the user B has been evaluated.

Note that, the information processing device 20A or 20B does not have to instruct the wearable terminal 10A or 10B to vibrate every time the notification to the user A or B is issued. For example, in the case where the information processing devices 20A and 20B receive the interaction information and the evaluation information (S313), any one or both of the information processing devices 20A and 20B do not have to instruct the wearable terminals 10A and 10B to vibrate (S315). In this case, the wearable terminals 10A and 10B that have not received the vibration instruction do not vibrate (S317).

6. CONCLUSION

As described above, it is possible for the information processing system according to the embodiment to specify another user who a user has interacted with in the real world as an individual registered in a predetermined database by using voice information and identification information of a wearable terminal 10.

It is also possible for the information processing system according to the embodiment to acquire information on a user who the user has interacted with in the real world from a predetermined database stored in the information processing server 30 and to present the information to the user.

It should be understood by those skilled in the art that various modifications, combinations, sub-combinations and alterations may occur depending on design requirements and other factors insofar as they are within the scope of the appended claims or the equivalents thereof.

In addition, it is also possible to create a computer program for causing a hardware such as a CPU, a ROM, and a RAM to execute functions equivalent to the configuration of the information processing system according to the embodiment of the present disclosure. Moreover, it is possible to provide a recording medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing server including
    a specification unit configured to specify an individual registered in a predetermined database on the basis of identification information sent from a near-field communication device and collected voice information.

(2) The information processing server according to (1),
    in which, on the basis of the voice information, the specification unit specifies the individual registered in the database among a plurality of individuals around a user, each of the plurality of individuals having the near-field communication device.

(3) The information processing server according to (2),
    in which the specification unit specifies the individual by analyzing the voice information and checking the analysis result against voiceprint information of the individual.

(4) The information processing server according to (2) or (3), further including
    an interaction information generation unit configured to generate interaction information indicating interaction between the user and the specified individual.

(5) The information processing server according to (4),
    in which the interaction information includes information on a history of interaction between the user and the individual.

(6) The information processing server according to (4) or (5),
    in which the interaction information includes evaluation information indicating evaluation of the individual made by the user.

(7) The information processing server according to any one of (4) to (6),
    in which the interaction information includes the voice information, and further includes information on a direction in which voice has been detected when the voice information has been collected.

(8) The information processing server according to any one of (4) to (7),
    in which the interaction information includes information on a posture of the individual.

(9) The information processing server according to any one of (4) to (8),
    in which the interaction information includes information on distance between the user and the near-field communication device that has been calculated on the basis of radio field strength of a signal including the identification information.

(10) The information processing server according to any one of (1) to (9),
    in which the identification information and the voice information are acquired by a wearable device worn by a user.

(11) An information processing device including
    a notification generation unit configured to generate interaction notification that presents a user with interaction information indicating interaction with an individual who is specified on the basis of identification information sent from a near-field communication device and collected voice information.

(12) The information processing device according to (11), in which
the interaction information includes the voice information, and
the voice information is playable in response to input from the user.

(13) The information processing device according to (11) or (12), in which
the interaction information includes information on a history of interaction with the individual, and
the history of the interaction is changeable in response to input from the user.

(14) The information processing device according to any one of (11) to (13),
in which evaluation information indicating evaluation of the individual is attached to the interaction information in response to input from the user.

(15) The information processing device according to any one of (11) to (14), in which the interaction notification is image display in which the interaction information is spatially arranged in accordance with a position of the individual in a real space.

(16) The information processing device according to (15),
in which, in the image display, the interaction information is displayed as an image according to a posture of the individual acquired by the near-field communication device.

(17) The information processing device according to any one of (11) to (16), further including
a sensor unit configured to detect information on an external environment,
in which the notification generation unit generates alert notification to the user on the basis of the information detected by the sensor unit.

(18) An information processing system including:
a specification unit configured to specify an individual registered in a predetermined database on the basis of identification information sent from a near-field communication device and collected voice information; and
a notification generation unit configured to generate interaction notification that presents a user with interaction information indicating interaction with the individual specified by the specification unit.

(19) An information processing method including
specifying an individual registered in a predetermined database on the basis of identification information sent from a near-field communication device and collected voice information by using an arithmetic processing unit.

(20) A program causing a computer to function as
a specification unit configured to specify an individual registered in a predetermined database on the basis of identification information sent from a near-field communication device and collected voice information.

What is claimed is:

1. An information processing server comprising:
processing circuitry configured to receive identification information of a second user from a first near-field communication device of the first user that receives the identification information of the second user from a second near-field communication device of the second user via a near-field communication link;
the processing circuitry is further configured to perform as a specification unit that specifies the second user as an individual registered in a predetermined database on the basis of the identification information received by the first near-field communication device of the first user from the second near-field communication device of the second user via the near-field communication link and collected voice information;
the processing circuitry is further configured to perform as an interaction information generation unit that receives interaction information concerning the second user including posture information indicating a posture of the second user from the first near-field communication device of the first user that receives the posture information indicating the posture of the second user from the second near-field communication device of the second user via the near-field communication link; and
after the specification unit specifies the second user as the individual registered in the predetermined database, the processing circuitry performing as the interaction information generation unit is further configured to inform the first user of the posture of the second user received from the second near-field communication device of the second user via the near-field communication link.

2. The information processing server according to claim 1,
wherein, on the basis of the voice information, the specification unit specifies the individual registered in the database among a plurality of individuals around a user, each of the plurality of individuals having the near-field communication device.

3. The information processing server according to claim 2,
wherein the specification unit specifies the individual by analyzing the voice information and checking the analysis result against voiceprint information of the individual.

4. The information processing server according to claim 2,
wherein the interaction information generation unit is further configured to generate the interaction information that further indicates an interaction between the first user and the individual.

5. The information processing server according to claim 4,
wherein the interaction information includes information on a history of interaction between the first user and the individual.

6. The information processing server according to claim 4,
wherein the interaction information includes evaluation information indicating evaluation of the individual made by the first user.

7. The information processing server according to claim 4,
wherein the interaction information includes the voice information, and further includes information on a direction in which voice has been detected when the voice information has been collected.

8. The information processing server according to claim 4,
wherein the interaction information includes information on distance between the first user and the second near-field communication device of the second user that has been calculated on the basis of radio field strength of a signal including the identification information.

9. The information processing server according to claim 1,
wherein the identification information and the voice information are acquired by a wearable device worn by at least one of the first user and the second user.

10. An information processing device comprising:
processing circuitry configured to perform as a notification generation unit that generates interaction notification information that presents a first user with interaction information indicating interaction with a second user who is identified as an individual registered in a predetermined database on the basis of identification information received by a first near-field communication device of the first user that receives the identification information of the second user from a second near-field communication device of the second user via a near-field communication link and further on the basis of collected voice information; and
after presenting the first user with the interaction information, the processing circuitry is further configured to inform the first user of posture information indicating a posture of the second user, the posture information being received from the first near-field communication device of the first user that receives the posture information of the second user from the second near-field communication device of the second user via the near-field communication link.

11. The information processing device according to claim 10, wherein
the interaction information includes the voice information, and
the voice information is playable in response to input from the first user.

12. The information processing device according to claim 10, wherein
the interaction information includes information on a history of interaction with the individual, and
the history of the interaction is changeable in response to input from the first user.

13. The information processing device according to claim 10,
wherein evaluation information indicating evaluation of the individual is attached to the interaction information in response to input from the first user.

14. The information processing device according to claim 10,
wherein the interaction notification is image display in which the interaction information is spatially arranged in accordance with a position of the individual in a real space.

15. The information processing device according to claim 14,
wherein, in the image display, the interaction information is displayed as an image according to the posture of the individual acquired via the near-field communication link.

16. The information processing device according to claim 10, further comprising
a sensor unit configured to detect information on an external environment,
wherein the notification generation unit generates alert notification to the first user on the basis of the information detected by the sensor unit.

17. An information processing system comprising:
processing circuitry configured to receive identification information of a second user from a first near-field communication device of the first user that receives the identification information of the second user from a second near-field communication device of the second user via a near-field communication link;
the processing circuitry is further configured to perform as a specification unit that specifies the second user as an individual registered in a predetermined database on the basis of the identification information received by the first near-field communication device of the first user from the second near-field communication device of the second user via the near-field communication link and collected voice information;
processing circuitry configured to perform as a notification generation unit that generates interaction notification information that presents the first user with interaction information indicating interaction with the second user who is identified as the individual specified by the specification unit; and
after presenting the first user with the interaction information, the processing circuitry is further configured to inform the first user of posture information indicating a posture of the second user, the posture information being received from the first near-field communication device of the first user that receives the posture information of the second user from the second near-field communication device of the second user via the near-field communication link.

18. An information processing method comprising:
receiving, by a first near-field communication device of a first user, identification information of a second user from a second near-field communication device of the second user via a near-field communication link;
specifying, by processing circuitry, the second user as an individual registered in a predetermined database on the basis of the identification information received by the first near-field communication device of the first user from the second near-field communication device of the second user and collected voice information;
receiving, by the first near-field communication device of the first user, interaction information concerning the second user including posture information indicating a posture of the second user from the second near-field communication device of the second user via the near-field communication link; and
after the specifying, informing the first user of the posture information indicating the posture of the second user received by the first near-field communication device of the first user from the second near-field communication device of the second user via the near-field communication link.

19. A non-transitory computer readable storage medium storing a program causing a computer to perform the method according to claim 18.

* * * * *